United States Patent [19]
Mason et al.

[11] 3,761,675
[45] Sept. 25, 1973

[54] MATERIAL CUTTING AND PRINTING SYSTEM

[75] Inventors: William J. Mason, Westlake Village; Douglas W. Wilson, Pacific Palisades; Douglas M. Considine, Miraleste; Felix Jerome Viosca, Canoga Park; J. Philip Wade, Simi, all of Calif.

[73] Assignee: Hughes Aircraft Company, Culver City, Calif.

[22] Filed: Jan. 19, 1972

[21] Appl. No.: 219,007

[52] U.S. Cl.. 219/121 LM, 83/925 CC, 235/151.11
[51] Int. Cl............................................. B23k 27/00
[58] Field of Search ............... 214/121 L, 121 EB; 235/151.11; 340/172.5; 444/1; 83/71, 925 CC

[56] References Cited
UNITED STATES PATENTS

| | | | |
|---|---|---|---|
| 3,226,527 | 12/1965 | Harding | 214/121 L |
| 3,597,578 | 8/1971 | Sullivan et al. | 214/121 L |
| 3,614,369 | 10/1971 | Medley | 214/121 L |
| 3,612,814 | 10/1971 | Houldcroft | 214/121 L |
| 3,548,502 | 12/1970 | Baldwin | 83/925 CC |
| 3,610,081 | 10/1971 | Gerber | 83/925 CC |
| 3,548,699 | 12/1970 | Gerber | 83/925 CC |
| 3,422,246 | 1/1969 | Wetzel | 214/121 L |
| 3,369,101 | 2/1968 | Di Curcio | 214/121 L |
| 3,391,342 | 7/1968 | Doyle | 340/172.5 |

FOREIGN PATENTS OR APPLICATIONS 993,705 6/1965 Great Britain ................. 214/121 L

OTHER PUBLICATIONS

"Laser Cuts a Fine Figure" Washington Post March 9, 1971.
"The Carbon Dioxide Laser" Design Engineering May 1969 pp. 47–49.

*Primary Examiner*—R. F. Staubly
*Assistant Examiner*—George A. Montanye
*Attorney*—W. H. MacAllister et al.

[57] ABSTRACT

A cloth cutting system wherein cloth is carried in a single layer into a cutting area wherein a laser beam is focused on the cloth and is directed by computer commands to travel within the cutting area so as to cut a plurality of patterns through the cloth rapidly and accurately.

15 Claims, 15 Drawing Figures

System Flow Chart

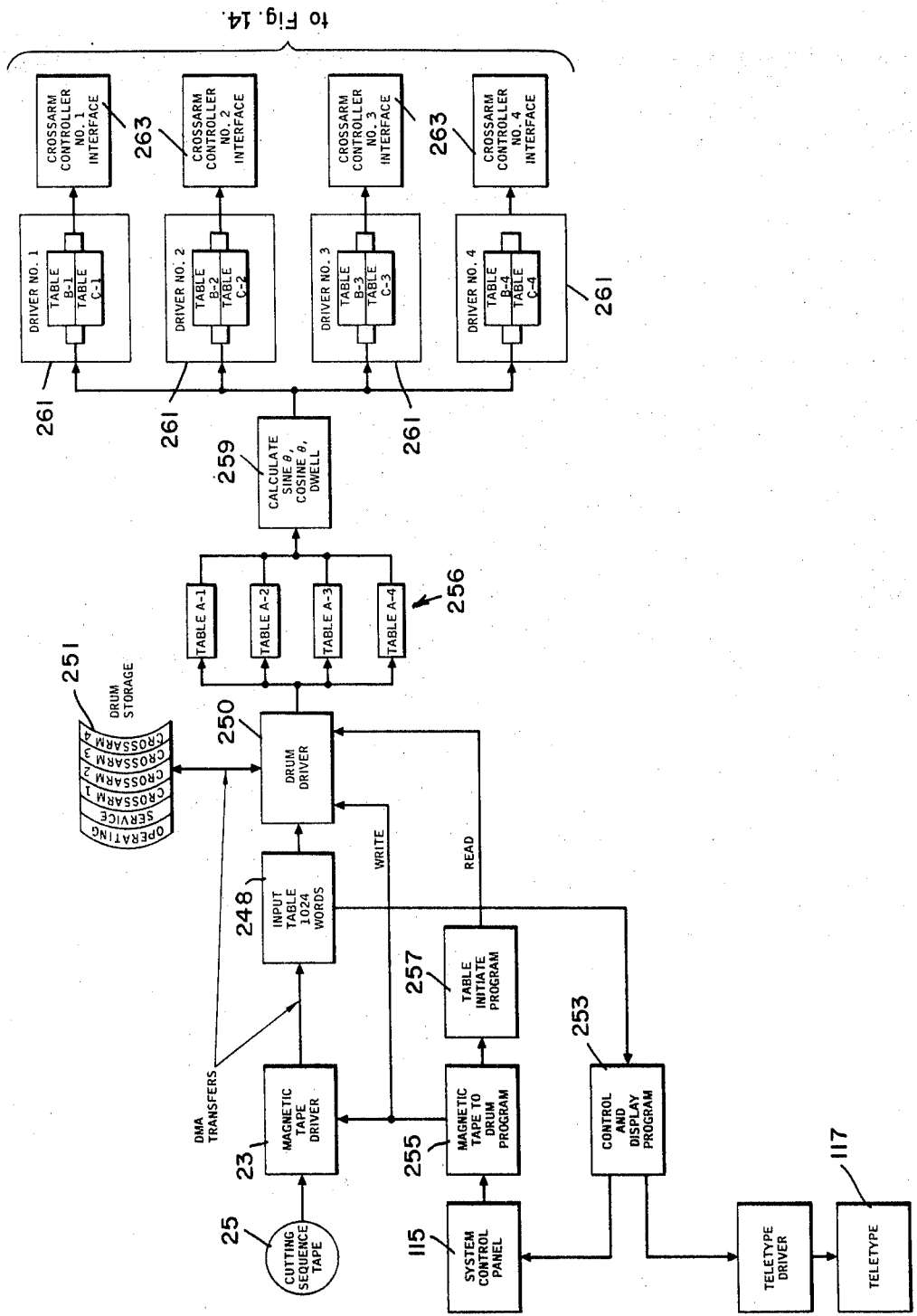
Fig. 13. Crossarm Computer Operating System

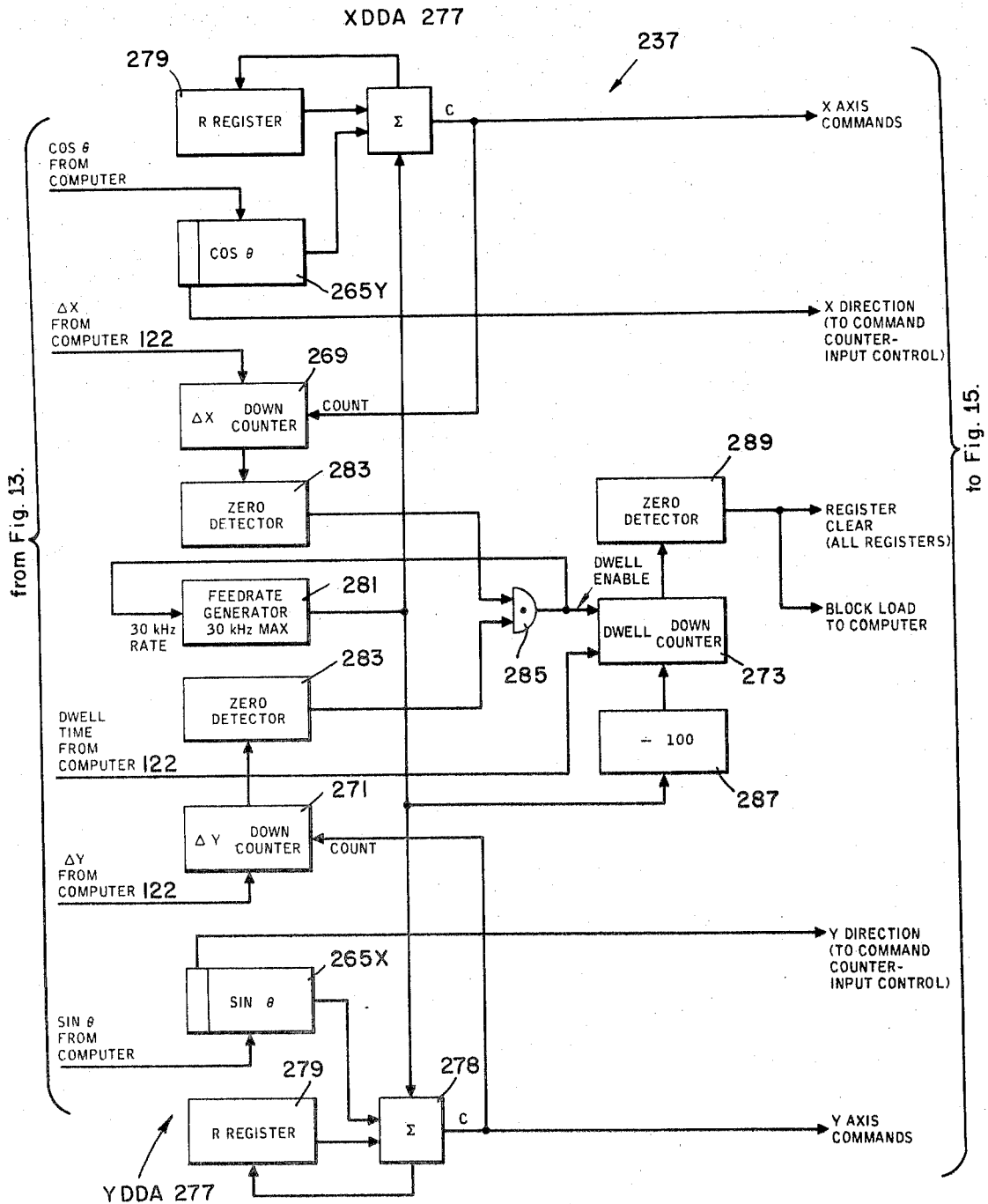
Fig. 14. Crossarm Controllers

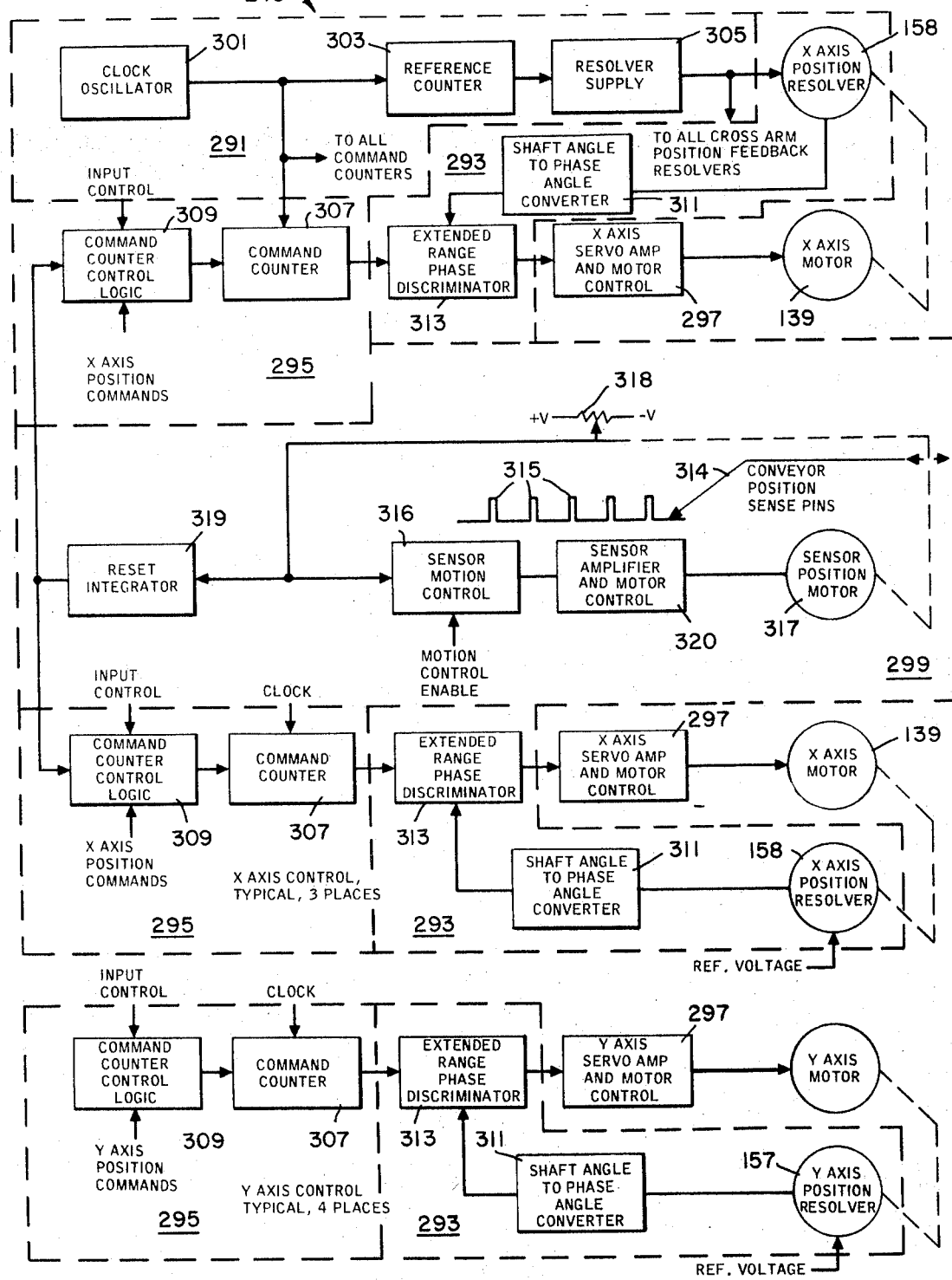
Fig. 15. Servo System

MATERIAL CUTTING AND PRINTING SYSTEM

CROSS REFERENCES TO RELATED APPLICATIONS

LASER CUTTING SURFACE, U.S. Pat. application Ser. No. 3,665 filed by Robert M. Zoot on Oct. 8, 1971 as a continuation of pending prior application filed on Jan. 19, 1970, discloses a honeycomb surface for supporting material being cut by a laser beam without reflecting the beam back at the material.

Howard R. Friedrich, U.S. Pat. application Ser. No. 3,627 for a LASER LENS COOLING SYSTEM filed Jan. 19, 1970, now U.S. Pat. No. 3,696,230, discloses a system wherein a stream of gas is used to cool a laser beam focusing lens and also for controlling combustion of the material being cut.

An improved working surface featuring knife-edged supports is the subject of U.S. Pat. application Ser. No. 218,896 filed by Georgette S. Egan on a WORKING SURFACE FOR RADIANT ENERGY BEAM CUTTER concurrently herewith.

A system whereby a laser beam is movable on a selected surface without moving the beam's source is the subject of U.S. Pat. application Ser. No. 219,007 filed by Robert M. Zoot and Douglas W. Wilson on a LASER CUTTER OPTICAL SYSTEM concurrently herewith.

MATERIAL HOLDING AND SMOKE REMOVAL SYSTEM FOR A LASER CUTTER, U.S. Pat. application Ser. No. 184,139, filed on Sept. 27, 1971 by Rodolfo Castro and Esteban J. Toscano, discloses a system for both holding in place fabric being cut and for removal of combustion by-products from the cutting area both above and below the cloth.

CONVEYOR ADVANCING SYSTEM, U.S. Pat. application Ser. No. 218,933, filed concurrently herewith, by Robert L. Hasslinger, William J. Newton, Esteban J. Toscano and Rodolfo Castro discloses a system for compensating positioning errors in a conveyor upon which material to be cut may be carried.

A system for controlling combustion of material being cut by a laser beam and for keeping debris out of a laser focusing system is the subject of U.S. Pat. application Ser. No. 202,422 filed on ENVIRONMENTAL CONTROL AT LASER CUTTING POINT by Rodolfo Castro, William J. Newton and Esteban J. Toscano on Nov. 26, 1971.

TENSION FREE CLOTH DISPENSING APPARATUS, U.S. Pat application Ser. No. 157,247 filed on June 28, 1971 by Rodolfo Castro, William J. Newton and Esteban J. Toscano discloses a system for dispensing fabric from a roll onto a conveyor without stretching the fabric.

A particularly advantageous method of allocating work to cutters used in the system claimed in the present application, while also disclosed herein, is separately claimed by Robert L. Hasslinger in WORKLOAD ALLOCATION FOR ONE OR MORE TOOLS, U.S. Pat. application Ser. No. 218,958 filed concurrently herewith. All of the foregoing are incorporated herein by reference, are U.S. applications and are assigned to the assignee of the present application.

BACKGROUND OF THE INVENTION

The present invention relates generally to a system and a method for cutting parts from a layer of material by severing the material according to preselected, stored patterns, and optionally marking the cut parts in accordance with stored information. Cutting and severing are used interchangeably, herein, both denoting the separation of the cut or severed material along the cutting or severing path.

The principal methods for cutting patterns of fabric for mass producing apparel is to stack the fabric many layers high and to make the cuts manually by means of a mechanical cutting device along the perimeters of wooden forms laid out on top of the stack. Even where the cutting operation is automated, as for example by means of an oscillating blade guided by means of numerical commands, the inherent speed limitations of the blade require stacking of the fabric for efficient operation. Multi-layer cutting, although efficient, has several disadvantages. First, it requires that the material be cut for a large number of suits of the same size and shape at the same time. As a result, the manufacturer must either wait until he has accumulated enough orders for a large run or he will have to maintain a large inventory.

Secondly, the cut pieces are usually not identical because of deviations in the cut between layers, particularly between those near the top and the bottom of the stack. This makes the sewing process more difficult and can in some instances affect the ultimate appearance of the garment.

Moreover, since cutting accuracy is limited, individual patterns must be spaced relatively far apart to prevent overlap. Yet another drawback of the multi-layer cutting is caused by slight variations in the color of the fabric. Thus, in order to insure that all the pieces making up a given garment have the same color, it is necessary to select all such pieces from the same layer of cloth. This requires that each layer of the stack be separately identified, a time consuming process.

The solution to all of these problems is a cutting process which is fast enough and accurate enough to make it economically practical to cut material in a single layer or "one-high."

Cutting of material in a single layer permits the manufacturer to cut the pattern for a single garment as soon as he receives an order for it. Thus, he can give fast service without assuming the burden of a large inventory, with its concomitant risk of obsolescence due to rapid changes in styles. Moreover, by numerically controlling the cutting process it can be made accurately repeatable so that each garment will have precisely the same shape as every other garment of the same size and shape. Furthermore, because of the greater accuracy, the different patterns can be more closely spaced, resulting in better material utilization. Yet another advantage of one-high cutting is that it permits patterns to be printed with identifying marks, sewing lines, and other information as an integral part of the pattern cutting process.

OBJECTS OF THE INVENTION

At first it would seem like a step backward to cut garment parts singly, part after part, rather than ten or twenty at a time as is being done currently. Certainly the time required to cut each garment would increase by an order of magnitude unless a radically different cutting technique were provided. It is the principal object of the present invention to provide the apparatus and the method which, by virtue of its accuracy and speed will permit the cutting of fabric for a single garment economically.

A related object of the present invention is to provide an apparatus and a method for cutting inherently flammable fabrics with a focused radiant energy beam without igniting the fabric.

Another object of the present invention is to provide a system for cutting sheet material such as cloth with a traveling, cutting focused beam of coherent light while keeping the operator of the system safe, both from the focused beam and from the smoke generated by the cutting process.

A relatd object of the invention is to provide the apparatus and method required accurately to cut the pieces for a plurality of dissimilar garments in rapid succession garment after garment, preferably in response to prerecorded numerical commands.

A further object of this invention is to produce patterns which are marked with sewing information as an integral part of the process of cutting these patterns, and preferably to do so in response to stored digital data.

BRIEF DESCRIPTION OF THE INVENTION

In accordance with the invention, material to be cut is laid upon a work support surface which is then moved together with the material lying thereon into a cutting area. Within the cutting area a plurality of spaced apart pieces are cut to preselected patterns from the material by moving a focused radiant energy beam in accordance with numerical commands. Once the cutting is completed, the work support surface with the cut pieces thereon is moved out of the cutting area. In accordance with a feature of the invention the material rests upon an air-permeable work support surface and air is forced to flow away from the underside of that support so as to remove by-products, such as smoke produced by the cutting process.

In accordance with another feature of the invention the cutting beam is a beam of coherent light which is generated by a stationary source, is projected while collimated at, and is focused at the material by, a movable optical device traversed within a cutting area, spaced closely above the material to be cut, and under the control of a digital computer which processes stored signals representing the desired patterns. For maximum cutting speed the laser beam is interrupted under the computer's control when the beam is between parts, thus allowing the focusing device to be traversed from the last cut part to the next part to be cut by the shortest route, without regard to passing over material whhch is to form a part.

It is a further optional feature of the present invention that the work support surface also moves through a printing area where the material is stopped next to a printing device. The printing device is operative to mark lines upon the material, either before or after it has been cut, and this marking action is preferably performed in response to numerical commands.

The apparatus and techniques of the present invention achieve their stated objective exceedingly well. Because the laser beam can be turned on and off almost instantaneously and can be traversed extremely rapidly, it is possible to go from pattern to pattern with great speed and the maximum cutting speed of individual patterns is of the order of 40 inches per second on the straight line segments. The speed is controlled to lower values as the tool approaches corners to prevent overshoot and resultant inaccuracy.

The cut produced by the focused laser beam is sharp and narrow, leaving the fabric unfrayed. With manmade materials such as Nylon and Dacron the laser beam also serves to seal the cut edges by melting them during the cutting process. Unlike a mechanical blade the laser beam never dulls, its cut remains uniform, and it is effective in cutting a wide range of materials even those having metallized thread.

BRIEF DESCRIPTION OF THE DRAWINGS

Additional objects and advantages of the invention will become apparent from the following detailed description with reference to the drawings in which:

FIG. 13 is a block diagram showing the organization of a computer suitable for driving numerical controls associated with the respective crossarms;

FIG. 14 is a block diagram of a numerical control for driving the servomechanisms of one of the crossarms in response to signals received from the computer of FIG. 12.

FIG. 15 is a block diagram of a suitable crossarm servomechanism.

GENERAL DESCRIPTION OF AN EXEMPLARY EMBOIDMENT OF THE INVENTION

Figure 1:
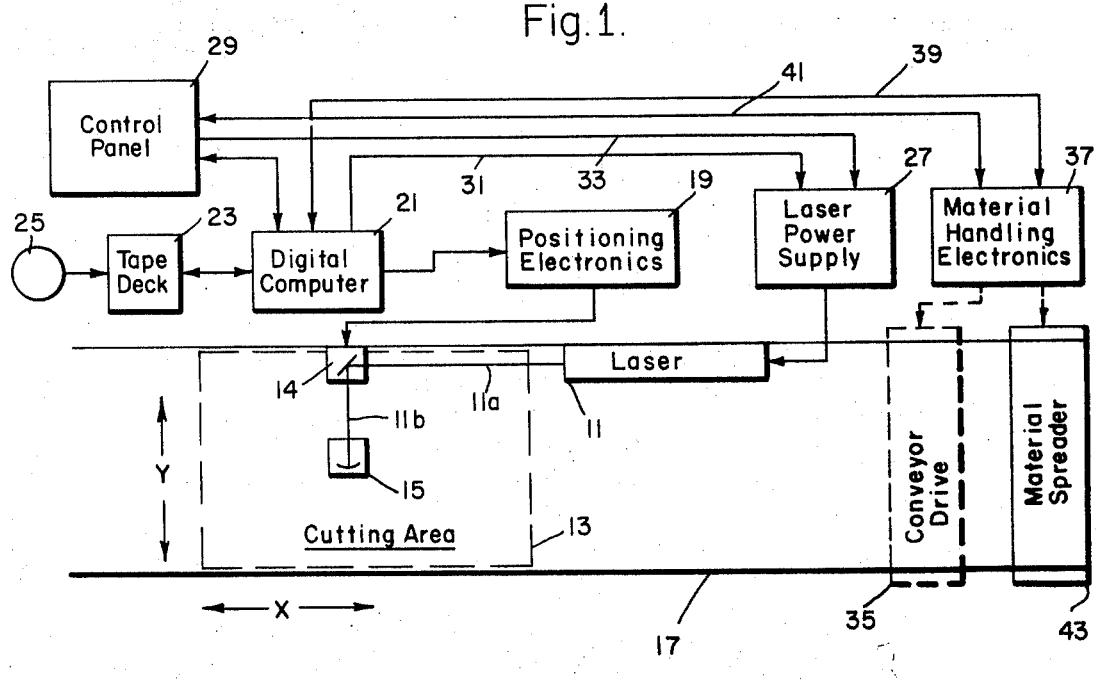
FIG. 1 is a block diagram of an exemplary system in which patterns are cut out of cloth by means of a focused laser beam.

An exemplary radiant energy cutting system illustrating the principles of the present invention is shown generally in FIG. 1. The radiant energy takes the form of a coherent light beam generated by a laser beam source 11 which is preferably stationary and aimed at a cutting plane within a cutting area 13 by means of a pair of optical devices 14 and 15. In a manner to be described shortly hereinafter, by appropriately moving the optical device 14 and 15 the laser beam produced by the source 11 can be traversed over the cutting area 13 so as to execute any desired route. It will be sufficient to note at this point that the laser beam remains unfocused during the initial portions 11a and 11b of its travel and is focused only in the second optical device 15 so as to become focused in the cutting plane which lies in the cutting area 13.

Material which is to be cut by the focused beam in the cutting area 13 is supported in a single flat layer upon a supporting structure 17 which preferably takes the form of a conveyor. It should be noted that, while the system of the present invention finds its greatest utility and advantage in permitting material to be cut at an economical rate in a single layer, the system could also be usefully employed where more than one layer is to be cut. However, for purposes of the description which follows, operation of the system will always be described with reference to the cutting of a single layer of material. In the exemplary system, the material from which parts are to be cut is a fabric which is unrolled from a bolt in a single continuous layer onto the conveyor 17 which is advanced in a series of equal steps so as to carry successive portions of the fabric lying thereon into the cutting area 13. After each advancement of the conveyor 17, parts are cut to patterns from the material lying within the cutting area 13, with the cutting performed being referred to as a "bite."

To traverse the focused laser beam in the cutting area 13 so as to cut out a plurality of separate parts, the optical devices 14 and 15 are moved together in the X direction (parallel to the longitudinal axis of the conveyor 17) and the optical device 15 is moved relative to the optical device 14 in the Y direction which is at right angles to the X direction. These movements are effected by positioning devices which are moved under the control of a positioning electronic circuit 19 whose principal function is to produce, in response to numerical commands generated by a digital computer 21, electrical signals compatible with the devices used to move the optical devices 14 and 15. The commands produced by the computer 21 are in turn derived by means of a tape deck 23 from a cutting sequence tape 25 upon which are stored signals which represent the locations and perimeters of the parts which are to be cut from the material in the cuting area 13. Preferably after each part has been cut, the laser beam is interrupted and the beam traversing apparatus which carries the optical devices 14 and 15 is moved to the starting point of the next part at which time the laser beam is re-established.

While interruption of the laser beam could be accomplished by means of a mechanical shutter interposed in the unfocused portion of the beam's path, in FIG. 1 a laser power supply 27 is shown to be responsive to the digital computer 21 and to a control panel 29 through lines 31 and 33 respectively. The function of the control panel 29 is to turn on the subsystems such as the computer 21, the positioning electronics 19, the laser power supply 27 and to coordinate them with one another. Thus, for example if, by conventional means such as limit switches or voltage sensors, it is detected that the device for positioning the optical elements 14 and 15 is inoperative, an interlock in the control panel 29 prevents the laser 11 from turning on. Similarly, the control panel 29 will prevent automatic operation of the overall system unless all of the subsystems are operational. Additionally, manual commands may be made by means of conventional pushbuttons provdied on the control panel and various indicating lights on the panel apprise the operator of the condition at various points in the system.

Advancement of the conveyor 17 is by means of a conveyor drive 35 such as an electric motor coupled through gears and drive sprockets to a pair of chains by means of which the conveyor 17 is advanced. Operation of the conveyor drive 35 is controlled by a material handling electronics subsystem 37 which is responsive to commands received from the digital computer 21 over a line 39 and which is also connected to the control panel 29 through a line 41 for the previously stated purpose. Switching of the laser power supply 27 and starting and stopping of the conveyor drive 35 through the material-handling electronics 37 may be accomplished either in response to command signals recorded on the production tape 25 or in response to command signals which are derived by means of the digital computer 21 from the information which it receives from the tape 25. Thus, the computer 21 may automatically produce the control signals necessary to operate the laser power supply 27 and the material-handling electronics 37 so that the laser power supply is turned on and off as each part is started and finished, while the material-handling electronics are started and stopped as each complete bite is begun and completed. Also controlled by the material-handling electronics 37 is a material spreader 43 whose function is to dispense the fabric from a bolt in step with the advancement of the conveyor 17 so that the material is deposited on the surface of the conveyor without stretching or wrinkling it excessively.

Summarizing this brief description of the exemplary system, the patterns to which parts are to be cut from the fabric being advanced by the conveyor 17 are recorded on the cutting sequence tape 25 so that as successive portions of the material are positioned within the cutting area 13, the digital data representing the patterns to which parts are to be cut from those portions are made available to the digital computer 21. The digital computer 21 processes the data associated with the particular portion of material in the cutting area 13 and applies that data in slightly different form, and with additional information generated by the computer, to the positioning electronics 19. The latter, in response, applies control signals to the devices which move the optical devices 14 and 15 so as to traverse the laser beam according to the "taped" patterns.

Before each part is cut, it is preferable that the laser beam positioning optical elements 14 and 15 be moved so that when the laser beam is turned on it will be at the starting point of that part. Then the devices 14 and 15 are moved so as to rapidly traverse the laser beam around the perimeter of the part and when the beam has reached the end point of the part, which will typically intersect its starting point, the beam is turned off and the optical devices 14 and 15 are moved to the starting point of the next part to be cut. When all of the parts which are to be cut during a given bite have been completed, the conveyor 17 is advanced so as to bring the next portion of the material into the cutting area 13, the system also being operative at this time to dispense material from the spreader 43 onto the conveyor.

As will be shown in more detailed drawings of the system, it may also include means for marking any of the parts which have been cutout of the material with information that can be used when those parts are sewn together into a garment. Thus, sewing lines for the garment into which the parts are to be made can be written onto these parts by a printing device which is translated in a manner similar to the manner in which the laser beam is translated and also under the control of the digital computer 21.

Turning next to a more detailed consideration of the optical devices 14 and 15, the function of the first optical device 14 is to "bend" the laser beam from its initial direction along the X axis to a second direction along the Y axis. This is accomplished preferably by means of a known optical device called the "pentaprism" which is operative to receive the initial portion 11a of the laser beam in its collimated (focused at infinity) state and to reflect that beam so that the second portion 11b of the laser beam which leaves the optical device 14 will be at 90° to the first portion 11a, and still collimated. The pentaprism, although known to those skilled in the art, is described in greater detail and shown in the above-referenced application entitled LASER CUTTER OPTICAL SYSTEM of Robert M. Zoot and Douglas W. Wilson. In particular as disclosed in FIG. 3 of that application, the pentaprism is comprised of a pair of flat mirrors disposed at a 45° included angle between them. The incoming laser beam 11a is aimed at one of the mirrors from which it is reflected at the other mirror which it leaves at right angles to its incoming direction. In an actual system wherein the laser beam source 11 was a $CO_2$ laser model 41 manufactured by the Coherent Radiation Company of Palo Alto, California, generating a 250 watt beam with a diameter of one centimeter, the mirrors comprising the pentaprism were each a 1-½ inch diameter silicon substrate coated with a dielectric coating selected for a 10.6 micron wavelength.

It will be understood of course that the pentaprism represents only one type of optical arrangement for changing the direction of the laser beam by 90°, several others being also disclosed for sake of example in the Zoot/Wilson application.

Figure 2:
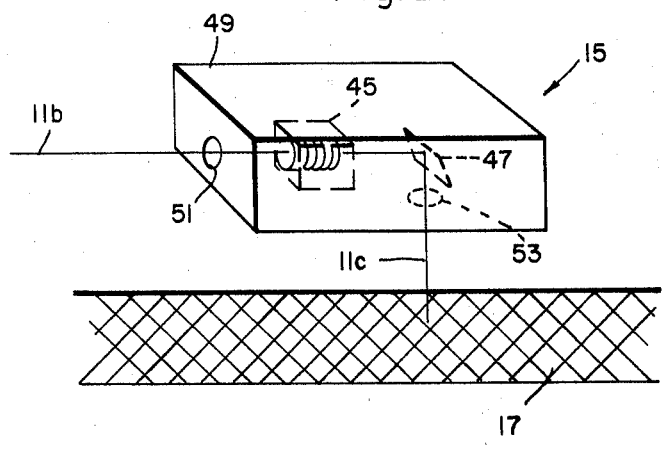
FIG. 2 is an exemplary focusing device which serves to redirect a laser beam from a direction parallel to the material to be cut into a second direction at the material and also to focus the beam.
Figure 3:
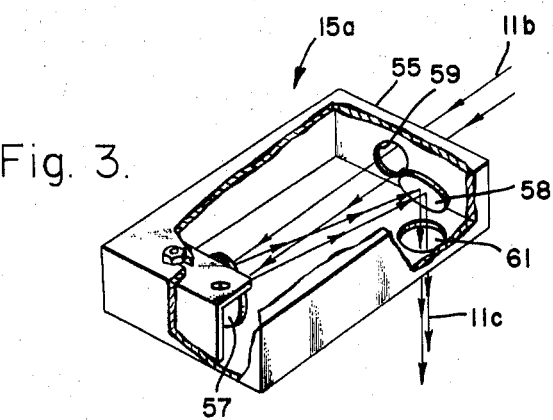
FIG. 3 is an alternative focusing device for accomplishing the same purpose but using only reflective optics rather than a lens as shown in FIG. 2.

Several alternative arrangements may also be utilized for the second optical device 15. Two of these are illustrated in FIGS. 2 and 3. In FIG. 2 the optical assembly 15 is seen to comprise a horizontally oriented focusing lens 45 and a flat mirror 47, inclined 45° to the vertical, both housed in a casing 49 having an inlet window 51 and an outlet window 53. The collimated, redirected laser beam 11b emerging horizontally from the first optical element 14 and entering the second optical device 15 through its inlet window 51, is focused by the focusing device 45 and is changed from its horizontal direction to a final vertical direction aimed at the conveyor work support surface 17 by the inclined mirror 47 through the housing outlet opening 53.

The alternative optical device 15a in FIG. 3, disclosed in detail in the aforementioned Zoot/Wilson application, is comprised of a housing 55 containing a focusing mirror 57 at one of its ends which receives the collimated laser beam 11b through an inlet opening 59. From the mirror 57 the laser beam is reflected onto a flat mirror 58 which is inclined 45° to the floor of the housing so as to reflect the beam out of the housing 55 through an outlet opening 61. The focal length of the mirror 57 is selected so as to bring the beam reflected therefrom to a focus at the conveyor work support surface 17 or slightly above it, depending upon the thickness of the material which is to be cut. In the above-mentioned system which has been built, both of the mirrors 57 and 58 had a one inch diameter and were silicon substrates coated for a 10.6 micron wavelength, with the focusing mirror 57 having a radius of curvature of 12 inches. The distance between the mirrors 57 and 58 was selected to be approximately 3 inches, as was the distance from the mirror 58 to the work support surface 17, giving a beam diameter of approximately one thirty-seconds of an inch where the beam was intercepted by the material lying upon that work support surface.

Yet another possible alternative for the focusing system for the laser beam is disclosed in the above-referenced U.S. Pat. application Ser. No. 3,627 by Howard R. Friedrich for a LASER LENS COOLING SYSTEM. In that system the positions of the elements 45 and 47 shown in FIG. 2 of the present application are reversed so that the collimated laser beam 11b first strikes a mirror so as to change the beam's direction to the vertical, and the vertically downwardly projected final portion of the laser beam is then focused by a focusing lens system having a vertical axis from which it emerges toward and impinges upon the work support surface 17.

Figure 4:
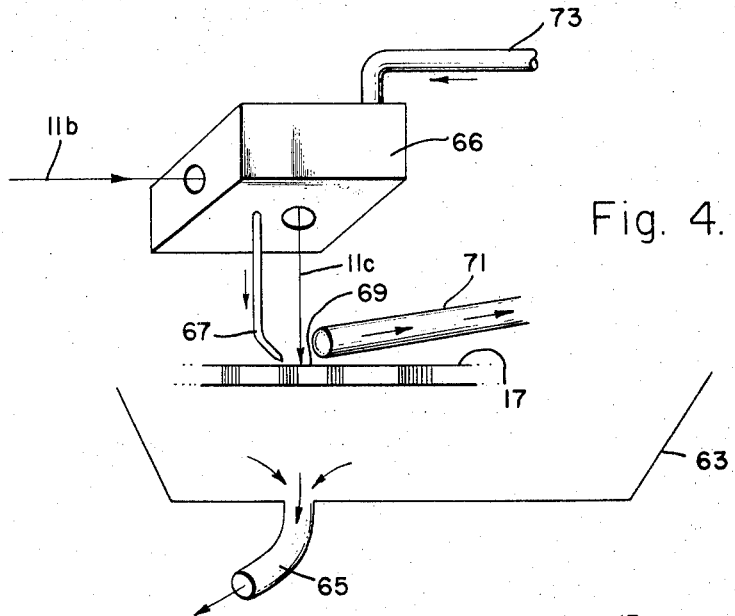
FIG. 4 illustrates the manner in which the smoke generated by the cutting laser beam is removed from above and from below the material which is being cut.

One of the important advantages of the system of the present invention is that it permits the cutting of fabric in a single layer. FIG. 4 illustrates how a single layer of fabric may be held upon the work support surface 17 while the by-products of the laser cutting operation are being removed and the ignition of the cut fabric is being inhibited. In acccordance with this aspect of the invention the work support surface 17 presented by the conveyor is air-permeable and air is drawn away from the underside of that surface by means of a chamber 63 which extends under the surface. Air is exhausted from the chamber 63 through an exhaust duct 65 by a conventional exhaust fan (not shown), causing the air pressure under the support surface 17 to be lower than that above it, and air and smoke to be drawn down through the support surface 17 and away from the system. It should be noted that this method of smoke removal and holding down of the material lying on the support surface has certain drawbacks, the principal of which is that some of the by-products of the cutting operation, such as smoke, tend to become lodged in the cut material. Therefore, alternative means may be employed for holding the cloth upon the air-permeable support surface 17 and for removing most of the cutting by-products generated. One of these disclosed in the above-referenced U.S. Pat. application Ser. No. 184,139 filed by Castro et al., entitled MATERIAL HOLDING AND SMOKE REMOVAL SYSTEM FOR A LASER CUTTER. In the system disclosed in the referenced application, rather than to draw air directly down through the air-permeable support surface 17, it is caused to flow along and across that surface above it, after which it is redirected so as to flow back across that surface underneath it. In this manner by-products of the cutting operation, such as smoke, are removed without trying to pull them through the cut material which, moreover is held against the support surface 17 by the pressure differential which exists between the air which flows above the surface and that which flows below it.

Returning to the exemplary environmental control illustrated in FIG. 4, ignition of the fabric which is being cut is controlled by directing a flow of gas through a small pipe 67 at the cutting area 69. The gas may be an inert gas such as nitrogen, in order to extinguish any flames which might be produced. Alternatively it has been found that if air is blown through the pipe 67 at the ignition area 69 at a sufficient velocity, it will extinguish any incipient flames through the same action by which a candle is blown out. To aid in the removal of debris created at the cutting area 69, an additional exhaust pipe 71 may be provided whose inlet is positioned next to the cutting area and from which air is exhausted by conventional means so as to evacuate most of the undesirable debris.

The gas which is to be discharged through the pipe 67 is supplied through an inlet pipe 73 which also serves to pressurize the inside of the housing 66 in which the optical elements are contained and from which the pipe 67 depends. By thus pressuiizing the housing, a continuous airflow can be maintained through the inlet and outlet openings of the housing through which the laser beam enters and exits, ther3by preventing the entry of undesirable debris therethrough. Alternatively, as shown in the refernced Castro et al. application on ENVIRONMENTAL CONTROL AT LASER CUTTING POINT, air may be caused to flow across the outlet window, through which most of the debris would tend to enter the housing, so as to create an air curtain to prevent contamination of the optics within the housing. It will be understood of course that, whereas the chamber 63 under the movable support surface 17 is stationary, the portions of the environmental control system which are located above the support surface are movable with the optical assembly contained in the housing 66, this applying particularly to the pipes 67, 71 and 73.

DETAILED DESCRIPTION OF THE EXEMPLARY SYSTEM

1. In general

Figure 5:
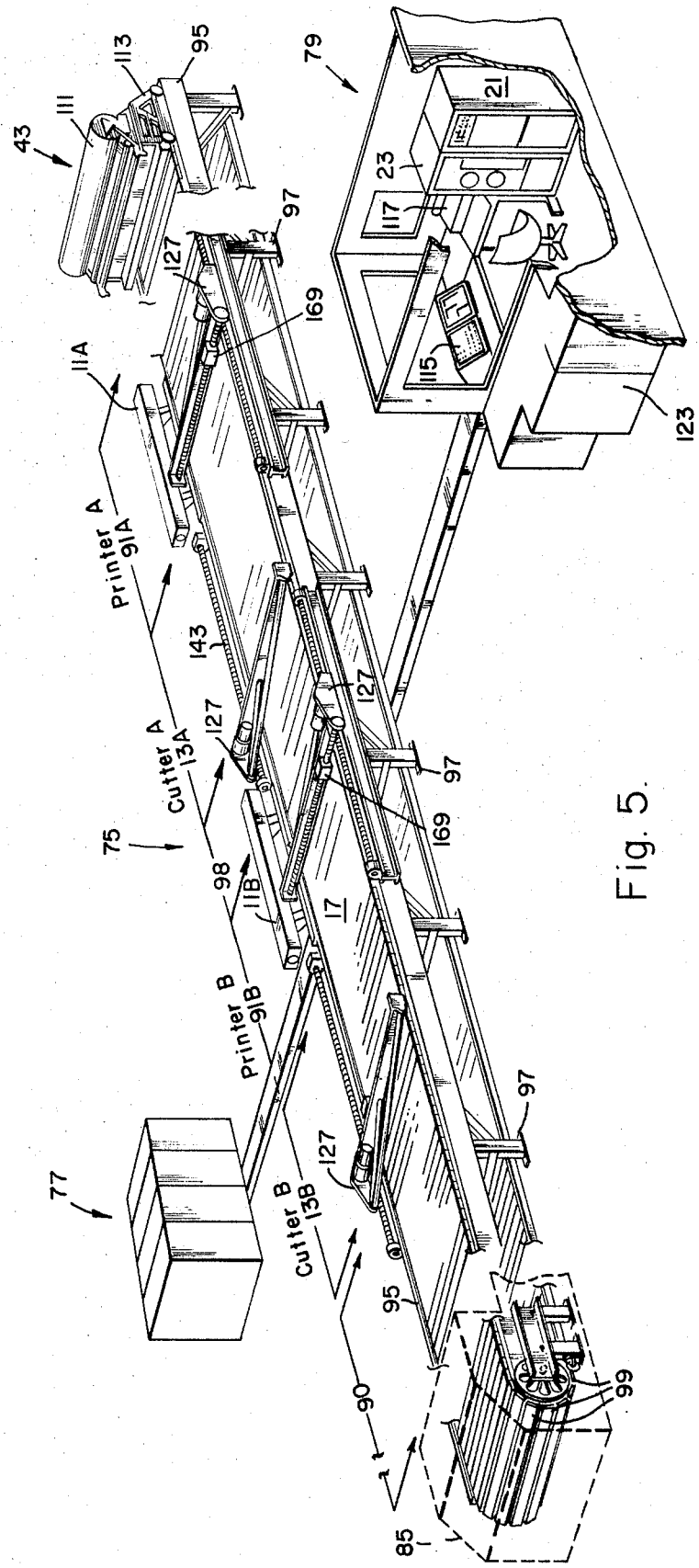
FIG. 5 is a perspective view of the exemplary system including a long conveyor made up of relatively thin slat assemblies, and also showing the carriages for traversing laser beams and printing devices over material lying thereon.
Figure 6:
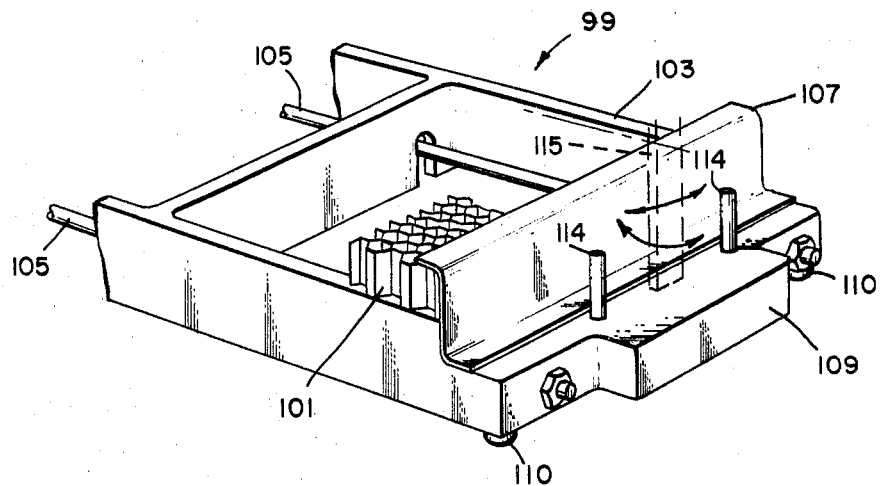
FIG. 6 is a perspective view, partially broken away, of a suitable slat assembly for the conveyor of FIG. 5.
Figures 7, 10:
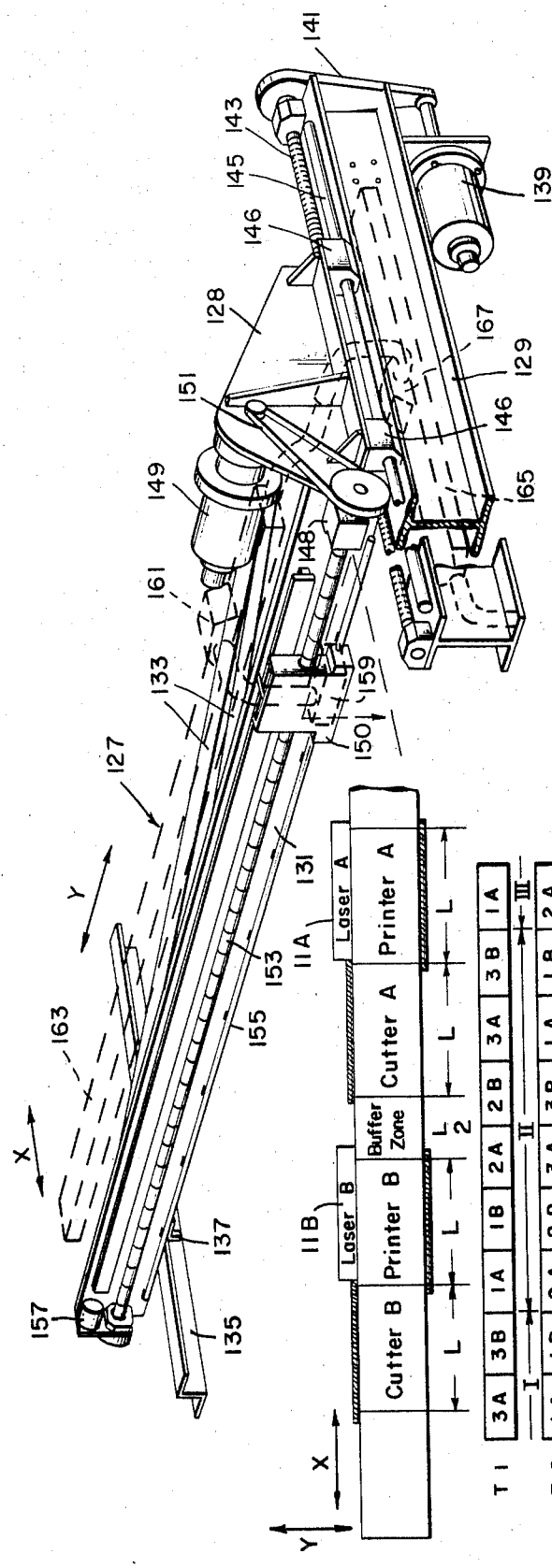
FIG. 7 is a perspective view of a crossarm assembly, of which four are shown in FIG. 5, and which is adapted to traverse a cutting tool or a printing device and in particular the focusing device of FIG. 2 or FIG. 3 over a predetermined work area above the conveyor assembly.
FIG. 10 illustrates the location of the work areas in which cutting takes place along the conveyor and the manner in which the workload is distributed between the several cutters.

Turning next to FIGS. 5, 6 and 7, the physical arrangement of the exemplary cloth cutting and marking system will be described in detail. Referring first to FIG. 5 the principal components of the system include a cutting and printing unti 75 within which those operations take place, a set of servo amplifiers 77 from which the signals controlling the cutting and printing elements emanate, and a control booth 79 in which the operator is seated and which contains the computing elements of the system.

2. The cutting and printing unit a. In general

Turning first to a detailed description of the cutting and printing unit 75, it is comprised principally of the conveyor 17, the fabric spreader 43 at one end of the conveyor, a scrap disposal unit 85 shown in dashed line at the opposite end of the conveyor, and two cutting areas 13A and 13B alternating with two printing areas 91A and 91B disposed along the length of the conveor 17 between the spreader and the scrap disposal units 43 and 85.

b. The conveyor

The conveyor 17 performs several tasks in the cutting and printing system. When its belt is in motion, it transports fabric from the spreader 43 at one end to a cut piece pickup area 80 near the opposite end. Additionally, the stationary framework portion of the conveyor 17, including principally a pair of steel beams 95 held by a set of legs 97, provides rigid support for the lasers 11A and 11B a pair of cutting and printing crossarms, the spreader assembly 43 and the scrap disposal unit 85.

In a particular unit proposed for construction, the conveyor assembly including the above-mentioned equipment would be approximately 87 feet long, 9 feet wide and 4-½ feet high. The conveyor would provide a level work surface area approximately 85 feet long by 5-½ feet wide located approximately 3 feet above the floor. It will be understood of course that the above figures are mentioned merely to illustrate the magnitude of the appratus shown in FIG. 5 rather than to imply that those figures are inherently necessary.

The conveyor 17 illustrated in FIG. 5 is divided into seven functional zones in the following manner. The spreading function, whereby material is spread onto the support surface formed by the conveyor belt is performed in the first approximately 12 ft. long portion of the conveyor. A permanently mounted fabric spreader 43 of a type normally used in apparel cutting rooms occupies the initial 2.5 ft. and the remaining 10 ft. are left unobstructed to help in the visual inspection of the unrolled fabric for flaws or creases. The cutting and printing zones 13A, 13B, 91A and 91B would each be 10 ft. long in the proposed machine and, for reasons which will be explained hereinafter, would be separated by a 5 ft. buffer zone 98. The last five zones 91A, 13A, 98, 91B, and 13B, which in the proposed machine would comprise a 45 ft. long section of the conveyor 17, are dimensionally critical because of the limited focal length of the optics used to focus the laser beam upon the material which is supported by the conveyor. Particular attention should therefore be given to assign fabrication tolerances which will assure the necessary flatness over the entire 45 ft. long area to maintain the material held by the conveyor 17 within the focused portion of the laser beam.

The sixth functional zone of the conveyor 17 is a pick-up zone 90 which in the proposed machine would be approximately 21 ft. long and which is left unobstructed to permit access for either manual or automatic piece part pick-up. Part of this pick-up zone is cut away in FIG. 5 to reduce the size of the drawing. Finally, the remaining few inches of level surface between the pick-up zone 90 and the end of the conveyor 17 falls within the operating zone of the scrap disposal apparatus indicated at 85. Not shown in FIG. 5 is the chamber 63 of FIG. 4 which encloses the underside of the conveyor 17 at least in the cutting areas 13A, 13B.

Turning next to some of the details of the conveyor 17, it is comprised principally of a plurality of long and slender slats 99, one of which is illustrated in part in FIG. 6. The use of such slats featuring a honeycomb panel 101 is not applicants' invention. Instead the concept of the honeycomb panel itself as a suitable support surface to withstand a focused laser beam is the invention of Robert M. Zoot by whom the above-referenced U.S. Pat. application Ser. No. 3,665 was filed thereon. Furthermore, the concept of configuring a conveyor out of a plurality of slender slats made of the Zoot-type honeycomb is the invention of Georgette S. Egan, applicant in the above referenced application.

As shown in FIG. 6, the honeycomb slat may be constructed by providing a strip of honeycomb material 101 supported upon a casting 103, preferably aluminum, held rigid by tensioning rods 105. The slats are interconnected into a conveyor belt by means of chains (not shown) attached to their corresponding ends 109. Alternatively, the honeycomb slats may be made lighter by dispensing with the aluminum casting 103 and the tensioning rods 105 and by bonding instead a pair of thin support members to the opposite longitudianl edges of the honeycomb panel 101, with the top edges of the support members being beveled to a knife edge to prevent undesirable reflections from them. Such a honeycomb slat is disclosed and claimed in the above-referenced Egan application.

Subject to control signals from the control booth 79, the conveyor slats 99 are moved by their connecting chains as a single conveyor belt by a drive motor (not shown) through conventional coupling gears and sprockets. To help the conveyor slats 99 to move smoothly along the steel beams 95, they are provided at their four corners with plastic (typically DELRIN) pads 110 which slide along the suitably finished top surfaces of the beams. Preferably the support beams 95 will have precisely machined surfces covered by a lubricant to minimize friction and wear while also insuring that the slats which ride on them will form a precisely level work support surface. In this connection it is important to give attention to maintaining the sag of the individual slats 99 within acceptable limits dictated by the depth of focus of the laser beam.

c. The spreader

Cloth to be supported and transported by the conveyor 17 is dispensed from the fabric spreader 43 which is anchored at the upstream end of the conveyor and on which a bolt of fabric 111 is rotatably supported on a frame 113. It will be noted that the spreader 43 is shown to have a set of wheels at the bottom of its frame 113. This is so because the spreader which has been proposed for use in the exemplary system of FIG. 5 is one of conventional construction whose manner of operation is that the entire spreader is moved along its wheels along a level surface onto which the material resting upon the spreader is unrolled as the spreader is moving along. The functions of the fabric spreader 43 and of the material holding surfce 17 in the exemplary system of FIG. 5 are reversed, with the fabric spreader remaining stationary and the work support surface moving, thereby drawing the fabric away from the spreader. This concept of reversing the functions of spreader and work support surface is also the invention of Georgette S. Egan and is separately claimed in her abovereferenced application.

As disclosed more fully in the Egan application, a CRA Champion model spreader is modified by removing a gear with which that model senses the rate of spreader travel along the material support surface. The sensing gear normally drives a shaft on the spreader, and control devices on the latter turn the bolt 111 at a rate which will dispense cloth therefrom at a constant linear rate. As part of the proposed modification this sahft is coupled by an appropriately proportioned drive train to one of the sprockets driving the conveyor belt. By proper gear ratio selection, the bolt 111 upon the stationary spreader 43 is caused to feed cloth onto the conveyor belt at the same linear rate at which that belt travels.

Alternatively, as disclosed in the above-referenced Castro, Toscano, Newton application on TENSION-FREE CLOTH DISPENSING APPARATUS, the spreader may be controlled by introducing a freehanging loop into the material between the spreader 43 and the conveyor belt. The length of the loop is sensed by photocells so that bolt 111 is turned in response to the loop becoming shorter than a predetermined minimum.

THE CROSSARM ASSEMBLY

Returning now to the cutting and printing unit 75, as mentioned earlier it includes a pair of cutting areas 13A and 13B alternating with a pair of printing areas 91A and 91B. Referring both to FIGS. 5 and 7, the first area through which cloth from the bolt 111 moves is the printing area 91A within which a printer crossarm assembly 127 operates to move a printing element anywhere within the printing area. A similar cutter crossarm assembly 127 moves within the first cutting area 13A just next to the printing area 91A. Since all of the crossarm assemblies are essentially identical whether they carry a cutting head or a printing head, they will all be identified by the reference numeral 127. Moreover, for sake of brevity, in the following discussion of a cutter crossarm assembly 127 shown in FIG. 7 it will be referred to by the abbreviated name "crossarm assembly."

The function of the FIG. 7 crossarm assembly 127 is to transport a pair of optical elements, such as the elements 14 and 15 of FIG. 1, within the cutting area 13 along the X direction so that the first optical element 14 remains in the path of the laser beam's collimated first path portion 11a. In addition to the crossarm assembly 127 also serves to transport the second optical element 15 relative to the first, along the Y axis so that the element 15 remains in the path of the laser beam's collimated second path portion 11b. This is accomplished in the exemplary system of FIG. 5 by aiming the laser beam precisely parallel to the longitudinal (X) axis of the conveyor 17 and moving the first optical element 14 precisely in line with the laser beam so aimed. The first optical element 14 is then made operative to redirect the laser beam exactly 90° from its initial direction so that it becomes projected in the Y direction across the width of the conveyor 17 and across the width of the cutting area 13.

Spanning the width of the conveyor 17, the crossarm assembly 127 has a relatively broad base 128 at one end which rides along a supporting rail 129 mounted upon the steel beam 95. Extending from the crossarm base 128 is a crossarm 131 held rigid by a pair of braces 133 and supported at its opposite end upon a second supporting rail 135 mounted upon the beam 95 on that side, the tip of the crossarm 131 being supported upon the rail 135 by means of a sliding bracket 137.

The crossarm assembly 127 is driven along the X axis by means of an electric motor 139 through a belt 141 which is coupled to and rotates a lead screw 143 extending along the top of the guide rail 129. Also extending along the supporting rail 129 next to the lead screw 143 is a way 145 upon which the crossarm base 128 is guided by a pair of bushings 146 rigidly attached to the base 128 and riding on the way 145. The first optical assembly 14 (FIG. 1) is mounted near the crossarm base 128 so as to move therewith along the X axis in the path of the first portion of the laser beam. An appropriate mounting place is indicated in FIG. 7 by the block 148, with the first optical assembly 14 being omitted for sake of clarity. The second optical assembly 15 (FIG. 1) is mounted on a second block 150 which is actually a carriage movable toward or away from the first mounting block 148 so as to maintain the optical assembly 15 (not shown in FIG. 7 for sake of clarity) in the path of the laser beam emanating from the first optical assembly 14 carried by the first block 148.

The carriage 150 is transported along the crossarm 131 by means of a Y axis electric motor 149 through a belt 151 and through a lead screw 153 which extends the length of the crossarm 131. A Y axis way 155 is also provided next to the lead screw 153 to help guide the carriage 150. The position of the carriage 150 along the crossarm 131 is monitored by means of a resolver 157 mounted at the tip of the crossarm 131 and geared to the lead screw 153. A similar resolver (not shown) may be geared to the X axis lead screw 143 to monitor the crossarm position along that axis.

To implement the concept of smoke removal illustrated schematically in FIG. 4 an air scoop 159 is provided inside the carriage 150 and is connected by means of a coupling 161 to an air duct 163 which runs along and above the crossarm 131 and whose top face is air-permeable to permit communication with the coupling 161. The duct 163 is connected at one of its ends through a further coupling 167 to a second duct which runs along the X axis supporting rail 129 under the crossarm base 128. Air is exhausted from one end of the second air duct 165. Both of the couplings 161 and 167 are slidable along the tops of their respective ducts 163 and 165 so that a continuous airflow is maintained through the system away from the scoop 159 inside the carriage 150.

The printer crossarm assembly 127 for transporting a printing unit within the printing area 93 is identical to the crossarm assembly 127 illustrated in FIG. 7, except that the smoke removal components are omitted and of course it carries no optical elements. Instead it carries a printing device of conventional construction upon its transport carriage 169. Also to take best advantage of the available space, the base portion of the printer crossarm assembly 127 is on the opposite side of the conveyor 17 from the base portion of the crossarm assembly 127. A suitable printer to be carried by the carrier 169 is marketed by the A. B. Dick Company under the name of VIDEO JET. The VIDEO JET operates like a miniature fluid nozzle, dispensing a uniform ink stream from a nozzle tip. The nozzle is modulated electro-mechanically at a high frequency to break the ink stream into uniform droplets and the ink stream is modulated electrically to deflect the particulated ink stream as a function of an electric charge imparted to it. For the exemplary system of FIG. 5 the nozzle assembly would be used without modulating either the ink stream or the nozzle. Instead a continuous stream would be dispsensed, with printing being accomplished by moving the carriage 169 along the X and Y axes to permit character generation as well as the drawing of any type of guide line. When a no-print condition exists, which is usually most of the time, the ink stream would be deflected into a gutter (not shown) from which it would be returned to the ink reservoir, thereby reducing ink consumption to about one-sixtieth of a quart per hour for the VIDEO JET printer. Filtering of the circulated ink in the high lint environment which is to be expected will be a critical requirement to which careful attention will have to be paid.

The crossarm method of traversing the cutting and printing units was developed under applicants' direction. In a system subsequently built by others for the assignee of the present invention, a different mechanism was employed which may be preferable in some applications where high speed and low inertia are controlling considerations. This mechanism was manufactured by Xynetics Inc. of Canoga Park, California and is described in Sawyer U.S. Pat. No. 3,376,578. Briefly, a platen containing a grid of magnetic material is mounted over each cutting or printing area. In the cutting areas 13A and 13B a pair of linear motors are carried on the underside of each platen upon which they are stepped digitally in the X and Y directions. To perform the function of a crossarm 127 the two motors are moved on common X coordinates along the Y axis. The first of them travels along the outer edge of the cutting area 13 and carries the first optical element 14. The second linear motor carries the second optical element 15 and moves not only along the Y axis with the first motor, but also moves relative to it along the X axis, just as the crossarm carriage 147 travels relative to the mounting block 148. In the cutting areas 91 only the second linear motor is required, carrying the printing unit along the X and Y axes.

Figure 8:
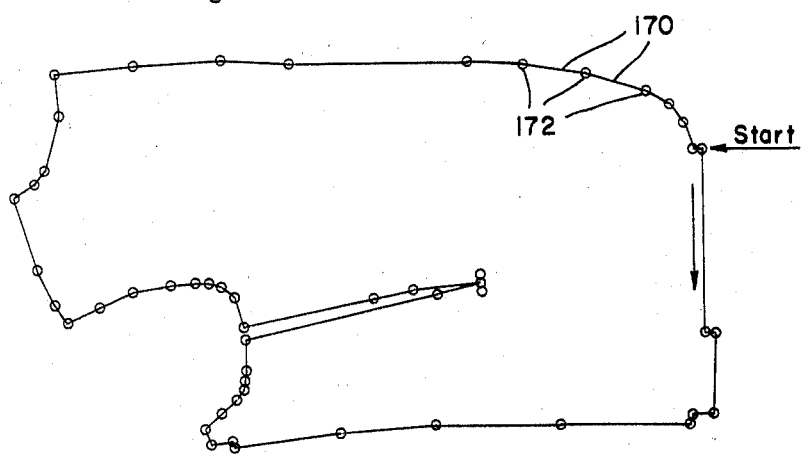
FIG. 8 illustrates a typical pattern cut by means of the system of FIG. 5.

A cloth panel cut by means of the exemplary system of FIG. 5 is illustrated in FIG. 8. The panel is seen to be cut in accordance with a pattern in a series of straight line segments 170, the starting and stopping points 172 of which are denoted by small circles. The number of line segments 170 and their length are selected so that the maximum deviation of the cut piece from the actual pattern will be less than, or equal to, a specified tolerance. In the proposed system this tolerance was specified as 0.0625 inches.

Figure 9:
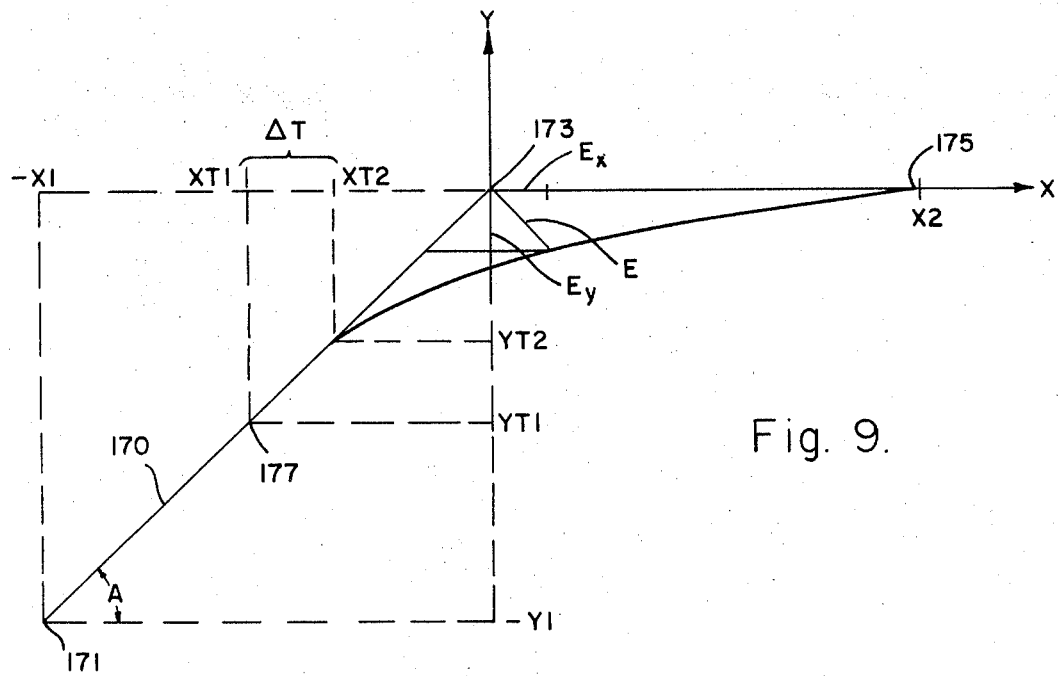
FIG. 9 illustrates an acceptable path approximation which may be made necessary by servomechanism errors.

FIG. 9 serves to explain a source of error which tends to occur in executing a pattern such as that shown in FIG. 8, this error being inherent in a type of servomechanism which may be used to advance the second optical element 15, hereinafter referred to as the "cutting head," in the X and Y directions with the crossarm assembly 127. If the servomechanism used is of a type having an appreciable velocity following error, the element which is being moved by the servomechanisms in the X and Y directions will lag in actual position the position where it is commanded to be at any given instant by the signals being fed to the servomechanisms. As shown in FIG. 9 for example, the first path segment extends from a starting point 171 to a terminal point 173 from which the second segment extends toward the right to a point 175. Because of the following error, the commanded element such as the cutting head 15 will fall short of its commanded position 173 at time T1 and will only be at point 177. Consequently, to permit the commanded component to move toward its desired position 173, a dwell time $\Delta T$ is provided before the next motion command is applied to the servomechanism.

Moreover, because there is a permissible error E which represents the distance by which the commanded element may miss its commanded point 173, the dwell time ΔT need not be made long enough to permit the element to move all the way to its commanded point 173 but may instead be terminated before that time, and the next command may be applied to it at time T2, which in the illustrated example is a purely X command, causing the commanded element to veer toward its second target point 175 such that it misses the first commanded target point 173 by a distance E. Stating it differently, in the exemplary system illustrated in FIG. 5 the acceleration and deceleration at the ends of the programmed line segments are also programmed. This acceleration/deceleration function is implemented by including a dwell time command as part of each control tape data block, wherein each block represents a series of movements to be executed by the crossarms 127 during an operating period. The dwell time or time delay at the end of each line segment 170 will be computed by the crossarm computer 21 as a function of four variables: Line segment length, initial velocity of the cutting head at the start of the line segment, allowable cutting tolerance E, and turning angle of the cutting head from a given line segment to the next.

To execute the movement illustrated in FIG. 9 the cutting head would be programmed for a combined X axis and Y axis displacement, taking it from the point 171 to the point 173 through axis components X1 and Y1, representing one straight line segment 170. This would be followed by a dwell time for that same line segment 170, starting at T1 and ending at T2. The dwell time command would be followed by a programmed X axis displacement, representing movement to execute the next straight line segment 170 from the point 173 to the point 175 through a distance X2. As will be explained hereinafter, although the commands as received from the production tape 25 (FIG. 1) are incremental displacements, these commands are converted in the digital computer 21 and the positioning electronics 19 of the system into synchronized X and Y axis servo velocity commands, typically a series of pulses. For example, the commanded displacement X1 would be converted to a constant velocity for a time T1. At time T1 the X axis velocity command goes to zero but because of the velocity following error, the X axis position at this time is only XT1. The conclusion of the velocity command at time T1 coincides with the beginning of the dwell time ΔT. During this time the movement along the X axis decelerates and the position at the end of the dwell time ΔT is XT2. However, since neither the X axis position nor the Y axis position is required to go to the ideal end point 173, the next position command X2 may be issued at this time T2. Thus the velocity command corresponding to the next incremental distance X2, representing the distance along the X axis between the points 173 and 175 may be issued to be executed during the time period which begins at T2 and ends at T3. The length of the dwell time ΔT is computed so that the total error E will be less than or equal to the maximum permissible error, assumed previously as 0.0625.

It should be understood that the only reason for delving into this aspect of servomechanism design is because in the following detailed description of a suitable electronic circuit for driving the servomechanisms, provision is made to insert a dwell time at the end of each path segment, so as to minimize the following error inherent in the servomechanisms that are described herein. However, there are other types of servomechanisms such as that described in the above-referenced Sawyer patent, which do not have the velocity following error that necessitates the provision of a programmed dwell time and to which the explanation given with reference to FIG. 9 would be irrelevant.

3. Crossarm Allocation of Marker Segments a. In general

Summarizing what has been described thus far, the exemplary cutting and printing system of FIG. 5 features a pair of cutting areas 13A and 13B, each of which contains a separate cutting device, a pair of cutting areas 91A and 91B containing respective printing devices. The use of two separate cutters sharing a common computer 21 represents a preferred embodiment of the invention. What will be described next is a particularly advantageous organization of the elments of the system of FIG. 5 whereby the cutting workload may be divided between the cutting heads 15 in the cutting areas 13A and 13B in a straightforward manner. Yet, by virtue of the system organization which will be described, the cutters between them will cut every required part without getting in each others' way. This particular aspect of the system is not the invention of Applicants, but is the invention of Robert L. Hasslinger by whom the above-referenced patent application for WORKLOAD ALLOCATION FOR ONE OR MORE TOOLS has been filed. Because the respective tools in the exemplary system of FIG. 5 are laser cutting heads carried by respective crossarms 127, the workload allocation concept will be referred to hereinafter as "crossarm allocation."

b. Detailed discussion of producing a cutting sequence tape

Figure 11:
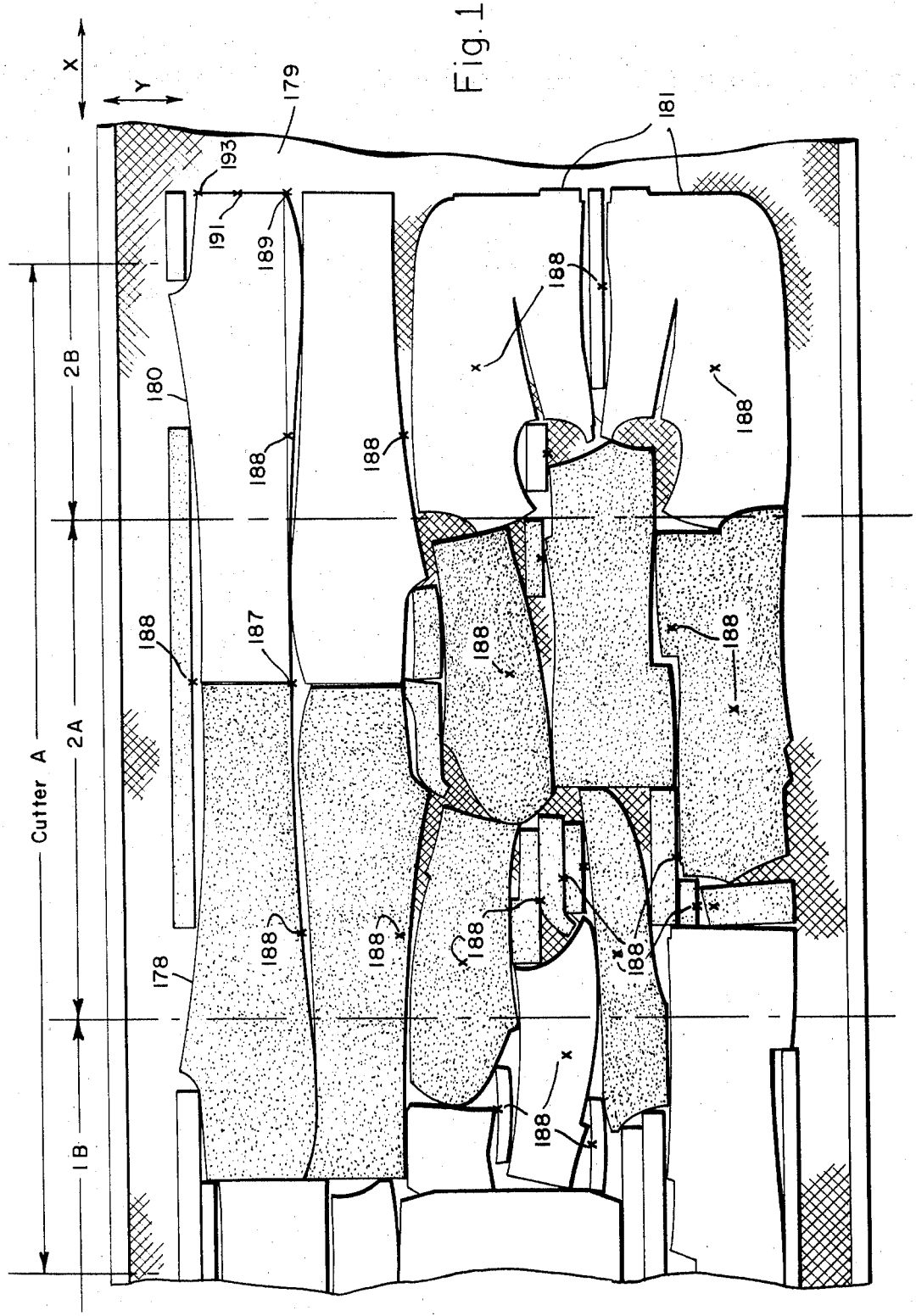
FIG. 11 illustrates a portion of a marker which includes several patterns laid out so as to waste a minimum of material and cut by means of the apparatus illustrated in FIG. 5.

Before explaining crossarm allocation in detail, it will be helpful to summarize the manner in which one would generate and store the data representing the patterns according to which garment parts are to be cut by the system from a layer of fabric. A portion of a length of fabric from which parts are to be cut for a garment is shown in FIG. 11. Typically, fabric is divided into lengths of the order of 30 ft. and the parts for up to three suits are cut from that length of fabric. Generally, the patterns corresponding to the various parts which are to be cut are laid out by people who are skilled in so arranging the patterns as to leave a minimum of space between them, thus minimizing fabric wastage. It is a portion of such a layout that is shown in FIG. 11 which contains most of the parts for a man's suit. Thus the trouser parts are discernible along the top of the material 179 in FIG. 11, and the panels 181 for a man's jacket are seen at the lower right-hand corner thereof.

The portion illustrated in FIG. 11 represents approximately one third of a 30 ft. length of fabric, the collection of patterns representing the parts to be cut from that length of fabric being commonly referred to as a "marker." In the exemplary system the electrical signals digitally representing the patterns according to which parts are to be cut are stored on a roll of magnetic tape, referred to herein as the cutting sequence tape 25. The cutting sequence tape is compiled through a series of steps which involves generally (1) the designing of a garment, (2) the conversion of each part of that garment into digital signals representing the pattern for those parts by means of a "digitizer," (3) the production of a pattern tape containing digital signals representing the digitized patterns, (4) the production of a marker tape containing the relative positions of the patterns making up the garment (and perhaps those making up an additional garment as well) and (5) the combination of the contents of the marker tape and the pattern tape into the final cutting sequence tape 25.

Figure 12:
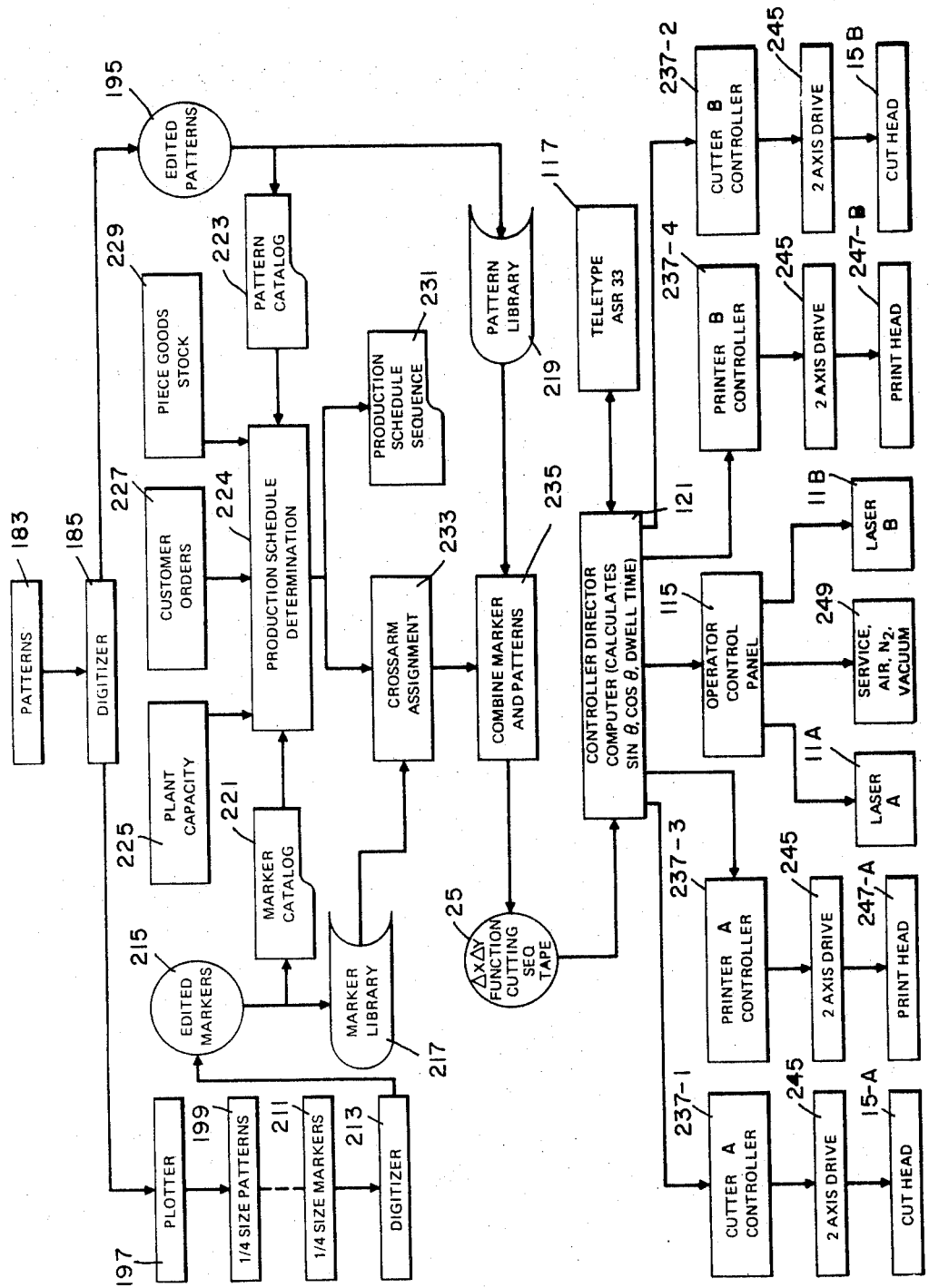
FIG. 12 is a flow chart which illustrates how the stored digital signals are created for producing a desired marker and how those signals are used to control various parts of the system.

Referring to FIG. 12, the first of the above steps is performed by an artist who designs a new garment and produces a drawing thereof. From that drawing a set of average-size patterns are produced as well as a set of graded patterns for all additional smaller and larger sizes. All of the patterns 183 are then placed on a digitizer 185 which is a commercially available device having a large flat surface upon which the pattern is placed and a follower device which can be traced along the perimeter of the pattern. By means of transducers and electronic circuits the digitizer converts the successive physical positions of its follower into digital signals repreenting the X and Y coordinates the successive positions of the follower and therefore the perimeter of the pattern.

In addition to producing a description of the pattern perimeter, the digitizer is used to provide three other types of data. These include: (1) a description of the particular part; (2) "a location key"; and (3) an "alternate origin point." The meaning of the location key and of the alternate origin point will be better understood by referring again to FIG. 11, and to the trouser part 180 illustrated therein. For each pattern the location key consists of three points 187, 189 and 191. The first point 187 is located at the lower left-hand corner of the part, called the "origin." The second point 189 is located at the right end of the part at the same Y coordinate as the point 187 but at a different X coordinate. The third point 191 of the location key is directly above the second point 189, at the same X coordinate but at a different Y coordinate. By defining the location of the key of a given pattern, that is by defining the location of its three points 187, 189 and 191, the location and orientation of the entire pattern is unambiguously defined. Thus, each of the parts as shown in FIG. 11 has a key whose desired location relative to every other part on the fabric 179 is stored in a manner to be explained.

Diagonally opposite from the first (origin) key point 187 is the alternate origin 193 of the part and of its corresponding pattern. By providing an alternate origin for the part it is possible to begin cutting it from that point rather than from the origin point 187 which may yield a shorter path length between that pattern and the next pattern to be cut, this path length being referred to as a "dry haul."

The description of each pattern is produced by means of a typewriter keyboard associated with the digitizer, by means of which numbers or letters, or a combination of both, may be entered into the storage medium upon which the position information is stored by the digitizer, these characters serving to identify the particular pattern which has been digitized.

The next step is to produce a pattern tape 195 which contains the digitized patterns for a given garment model, arranged so that any parttern can be read from the tape by referring to the part number of that pattern. Additionally it is desirable that the data on the tape be in a language or form compatible with a digital plotter so as to permit the patterns on the tape to be plotted for checking purposes. In the process of producing the pattern tape 195, the digitized data produced by the digitizer is processed on a general purpose computer such as the IBM 1130 wherein the data is converted into a plotter-compatible language and is also edited to uncover any errors which might have been introduced during the digitizing process.

From the edited pattern tape 195 or directly from the digitizer 185 the digitized pattern signals are applied to a plotter 197 by means of which one-fourth scale patterns 199 are drawn. These one-fourth size patterns are then laid out on a sheet of paper into the most compact configuration, such as that shown in FIG. 11. This step is usually done manually. The resulting one-fourth size marker 211 is then placed on a digitizer 213 which may be of the same type as the digitizer 185 referred to earlier, and by means of the digitizer 213 several types of data are derived from the marker 211. These include: (a) identification of the pattern part; (b) identification of the marker containing the pattern; and (c) location of the pattern key. The data generated by the digitizer is then edited by means of the same computer used to edit the pattern data. This serves both to convert the digitizer-generated data into plotter-compatible language and to uncover errors introduced during the digitizing process. The resulting edited data is stored on a magnetic tape labelled "Edited Markers 215" in FIG. 12, which contains the precise locations of all patterns comprising the whole marker as well as the identification legent for each part of the marker. At this point the edited marker and pattern tapes 215 and 195 are placed into a marker library 217 and a pattern library 219 respectively. Also at this time a marker catalog 221 is printed from the marker tape 215 which includes identification of the marker, its number, its maximum X and Y dimensions and its size. A pattern catalog 223 is also printed, it containing the number of each pattern and the number of the model of which it is a part.

Using the marker catalog 221, the pattern catalog 223, information concerning plant capacity 225, customer orders 227 for particular garments, and piece goods in stock 229, a production schedule determination 224 is made. The production schedule determination 224 is recorded on a work order sheet on which the scheduler notes both the number of the markers which contain the desired patterns and the material from which the parts for the ordered garments are to be cut. Preferably customer orders for garments will be arranged so that each customer's order will be completed before the next customer's order is cut.

To facilitate processing of the work order sheet, it is key-punched onto cards acceptable by a general purpose computer such as the IBM 360/30. The key-punched work order is then applied as the input to such a general purpose computer which is next used to compile the cutting sequence tape 25 therefrom. The process whereby the contents of the work order sheets are transformed into the cutting sequence tape 25 will typically include more than one processing run by the computer. During the initial run a production schedule sequence tape 231 is generated, this tape containing in proper order the identities of all markers required to fill the orders on the work sheets. As part of this run the computer may also verify that the required markers are indeed in the marker tape library 217. From the production schedule sequence taper 231 the computer will produce a marker sequence tape (not indicated in FIG.

13) which contains the stored signals representing the series of markers required for the scheduled production. In creating the marker sequence tape the computer will retrieve from the marker library 217 the markers which are called for by the production schedule sequence tape 231 and will write those markers on its output tape which is the marker sequence tape being generated. This marker sequence tape will therefore contain for each marker the identification of that marker, the identification and key location for each pattern comprising that marker, and the "dry haul" (inter-pattern) path for the production scheduled.

c. Crossarm allocation as part of producing the cutting sequence tape

The next step in generating the cutting sequence tape 25 is an essential feature of the Hasslinger crossarm assignment concept. As part of this step the marker sequence tape just generated is applied to the computer which divides each marker on the marker sequence tape into a plurality of equal parts, each of which corresponds to a corresponding plurality of equal transverse strips of the fabric to which that marker applies. Thus, referring to FIG. 11 it may be assumed that the fabric portion 179 shown there is part of a 30 ft. long segment which has been divided for crossarm allocation purposes into six transverse strips, each 5 feet wide. In FIG. 11 the center strip is labelled 2A and the partially drawn strips on its left and right are labelled 1B and 2B. The significance of the width of those segments and of the labels applied thereto will become apparent as this explanation proceeds.

Recorded on the marker sequence tape will be a marker corresponding to the 30 ft. section of fabric shown partly in FIG. 11 and it will include the key location and identification of each pattern which is to be cut from the particular portion of the fabric to which that marker applies. In accordance with the Hasslinger crossarm allocation method, the computer will select for each given transverse strip of the marker, such as the strip 2A in FIG. 11, all of the patterns of that marker whose longitudinal midpoints, (their mid-pints along the X axis) fall within that particular transverse strip. The longitudinal midpoint of a pattern may be derived from its key by computing the midpoint 188 of the line that extends between the key points 187 and 189. It will then allocate all patterns which have been thus selected to a particular one of the two cutters of the system. In FIG. 11 each fully appearing part is shown with its longitudinal midpoint 188. Those parts whose midpoints 188 are within the 2A strip, indicated by crosshatching, are assigned to cutter A in whose assigned work area that strip will become centered. In a similar manner the computer will then select all of the patterns of the marker whose longitudinal midpoints 188 fall into the following transverse strip of the marker, such as the strip 2B in FIG. 11, and it will allocate all of these patterns to the other one of the two cutting tools in whose assigned work areas those strips will become centered.

Within each set of patterns selected for a given transverse strip of a marker, the patterns will be executed (e.g., their parts cut) in the same order in which they were digitized.

To summarize, at the end of the crossarm allocation operation the computer will have derived from the marker sequence tape a tool allocation for each of the patterns called for by the marker on the tape so that the resulting tape 233 will contain not only the identification numbers and key locations of the patterns comprising the marker, but also for each of those patterns a particular tool by which that pattern is to be cut.

The next step, performed again by the computer, is to take the just produced tape 233 with both marker sequence and crossarm adjustments on it, and to combine that tape with the signals representing the patterns called for by the marker or markers on the tape. During the "Combine Marker and Patterns" step 235 the computer receives the Crossarm Assigned Marker tape 233 and from the pattern libary 219 the patterns which are called for by the tape 233 and during this step there is recorded on the output tape of the computer the full, complete set of signals representing each pattern called for on that tape. Thus the computer will read from the pattern tapes retrieved from the pattern library 219 the individual patterns in the sequence in which they are to be cut and will compute for each of those patterns a new set of X and Y coordinates. These new sets of coordinates will be based on the orientation of the pattern keys so that if a pattern key is at an angle to the X axis, the pattern coordinate will be "rotated" accordingly. The resulting output tape 25 will contain the X and Y coordinates for the perimeters of all of the patterns for each of the markers. More specifically, each pattern will be defined by a series of straight line segments, each segment being defined by an X and a Y component corresponding to the distance to be traversed by the cutter along the X and Y axes to execute that particular segment. A suitable data format for the cutting sequence tape will be described hereinafter with reference to the computing and control section of the FIG. 5 system.

d. Operation and organization of exemplary system using crossarm allocation

As mentioned previously, the concept of allocating patterns to respective ones of the cutting crossarms 127 is the invention of Robert L. Hasslinger and is being explained herein only to disclose the preferred manner of practicing the present invention which is the overall cutting and printing system illustrated by way of example in FIG. 5. Continuing with the explanation of the Hasslinger crossarm allocation method, what has thus been explained with reference to that method has been the manner in which various patterns are assigned to respective ones of the crossarms but not the reasons behind those assignments. Underlying the Hasslinger crossarm allocation method are certain desired system characteristics. First, each part should be cut completely by one cutting tool within one cutting area. Secondly, the work support surface upon which the fabric is supported and advanced should not be required to move in variable, individually programmed increments but instead should be advanced in equal steps of predetermined magnitude. Third, the method of allocating certain of the parts to one of the tools and the remaining part to the other tool should be easy to apply so as to minize programming complexity. To aid the reader in understanding the Hasslinger crossarm allocation method, a simplified plan view of the exemplary system of FIG. 5, which utilizes that method, is shown in FIG. 10. The illustrated system includes a pair of tools labeled cutter A and cutter B which are to be guided around the perimeters of a set of patterns positioned on an elongate surface 17 (the conveyor) movable along its longitudinal (X) axis. The system is controlled by a record such as magnetic tape containing signals digitally representing the perimeters and locations of the set of patterns as explained hereinabove. Each of the tools A and B is assigned an area of operation which extends along the longitudinal axis of the conveyor 17 by a length L which is at least twice as long as the longest dimension of any of the patterns along that axis. Additionally these areas of operation are spaced along the longitudinal axis by an odd multiple of L/2.

The support surface carries a length of fabric to be cut in accordance with the set of patterns and is divided into a plurality of transverse strips such as the strips 1B, 2A, and 2B in the FIG. 11. Each of those strips extends along the longitudinal axis of the work support surface, the conveyor, by a length L/2 (e.g., at least as far along the X-axis as the longest part) and in keeping with the invention the conveyor is successively advanced through the areas of operation of cutter A and cutter B by equal steps, each L long. As a result alternate ones of the transverse strips of L/2 width become centered within the area of operation of cutter A. Moreover, because of the spacing between the work areas of cutters A and B, which is selected to be an odd multiple of L/2, those strips which alternate with the strips which are centered in the work area of cutter A become centered in the work area of cutter B.

By (1) allocating an area of operation to each tool which extends at least twice as far along the X axis of the conveyor 17 as one of the transverse strips, each of which extends at least as far along the X-axis as the longest part, (2) centering the strips in these work areas, and (3) assigning to each tool the cutting of parts whose longitudinal centers fall within the strips which become centered in the work area of that tool, the Hasslinger method assures that each pattern will be completely cut by the tool to which it was assigned.

Immediately under the plan view of the printer cutter system in FIG. 10 portions of three consecutive markers labeled I, II and III are illustrated at successive times T1, T2, etc., each representing an operating period during which parts are being cut. Thus, at time T1 there are shown within the system the last two transverse strips of marker I, all 6 transverse strips of marker II, and the first strip of marker III. It will be seen that each marker is divided into transverse strips alternately labeled A and B. Thus, using marker II as an example, it is divided into three equal widthed transverse strips 1A, 2A, and 3A alternating with the second set of transverse strips labeled 1B, 2B and 3B. As a result of the Hasslinger crossarm allocation method which includes the sizing of the work areas of cutters A and B as well as the selection of the space between them, after the material corresponding to marker II has passed through the work areas of cutters A and B, its transverse portions 1A, 2A and 3A will have been centered in the work area of cutter A while its transverse portions 1B, 2B and 3B will have been centered in the work area of cutter B. Similarly, it may be verified by observation from FIG. 10 that in the case of the material corresponding to the marker III, those portions of the material corresponding to transverse strips 1A, 2A and 3A of the marker will be successively centered in the work area of cutter A while the portions corresponding to the transverse strips 1B, 2B and 3B are successively centered in the work area of cutter B.

Also in keeping with the Hasslinger crossarm allocation method, one of the tools, in the illustrated example, cutter A is actuated when the first and every subsequent odd transverse strip is centered within its work area (the A strips) and this actuation will be in response to the digital signals identifying those patterns whose longitudinal centers along the X axis fall within those strips. Similarly, the other of the tools, in the illustrated example the cutter B, is actuated when the second and every subsequent even transverse strip (the B strips) is centered within its assigned area of operation and this actuation again will be in response to those digital signals which identify the patterns whose longitudinal centers along the X axis fall within those second and subsequent even transverse strips.

Actuation of the proper tool in response to the proper digital signals is accomplished by the computer 21 (FIG. 1) whose function it is to route the data representing each pattern to the cutting tool to which that pattern was allocated. The precise manner in which this is carried out will be described hereinafter with reference to FIGS. 13, 14 and 15. Suffice it to say at this point, that after each advancement of the conveyor the cutters A and B are actuated concurrently, each of them tracing the patterns allocated to them in the sequence prescribed for those patterns.

From the foregoing description of the Hasslinger method it will be understood that the width of the transverse strips into which the markers are subdivided as well as the length of the allocated work areas of the cutters are determined by the longest (along the X-axis) part to be cut, the strips being as wide as the longest part, and the cutting areas being twice as long as the strips. Thus, in the foregoing description 5 foot strips were selected as sufficiently exceeding the longest part (54 inches) to be cut by the exemplary embodiment of the system in FIG. 5, and accordingly, each of the cutters had an allocated work area 10 feet in length. It will also be understood that the Hasslinger crossarm allocation method can be used whether or not the machine illustrated in FIG. 5 has printer stations. Thus, if only cutters were provided, the allocated work areas of the cutters A and B could be moved toward one another so that they would be separated only by the buffer zone, in which case the spacing between them would be L/2 (the smallest odd multiple of L/2). Moreover, the Hasslinger crossarm allocation method is not limited to use with two tools but may also be applied where only a single tool is used or where they number more than two. If only a single tool, such as the cutter A, were used there would of course be no need for a buffer zone and the conveyor would be advanced in steps of L/2, since each transverse section would be centered within the allocated work area of that cutter. With each advancement of the conveyor the cutter would be caused to trace through the perimeters of the patterns whose longitudinal centers fall within the transverse strip then centered in the allocated work area of that cutter. Similarly, if three cutters were used, the markers would be processed so that the patterns whose longitudinal centers fall within the first, fourth, seventh etc., strips would be allocated to the first cutter, the patterns whose longitudinal centers fall within th second, fifth and eighth transverse strips would be allocated to the second cutter and the patterns with longitudinal centers in the third, sixth, ninth etc., transverse strips would be allocated to the third cutter. Each strip would still be one-half as wide as each work area is long. In other words, if each work area is L in length each transverse strip of the marker will be up to L/2. However, since only every third strip is to be centered in a given work area, each advancement of the conveyor will be 3/2L. For the same reason, the minimum spacing between adjacent work areas will have to be at least L.

Selection of the patterns to be cut by a given tool has been shown to be based on the location of the longitudinal midpoint 188 of the pattern along the X axis. This represents the optimum use of the Hasslinger crossarm allocation method, since it will assure that any pattern whose longitudinal midpoint falls within a given transverse strip will not protrude beyond that strip by more than half of the maximum pattern length. Hence, if the strip is always centered within the assigned work area of the tool, that work area need not be greater than twice the length of the longest pattern along the X axis. Conversely, if a longer work area is acceptable, the reference point may be shifted from the longitudinal midpoint 188 of the pattern to some other point that lies between the leading and trailing edges of the pattern (as represented by the points 187 and 189) or even beyond those edges.

4. Computing and numerical control sections a. In general

There will now be described the computing and control portions of the exemplary FIG. 4 system whereby the crossarms 127 are traversed, the cutting and printing elements thereon are actuated and the conveyor 17 is started and stopped. It should be clearly understood that although a suitable computing system is described in detail for sake of completeness, other computer systems could be designed by those skilled in the art to operate the mechanical portion 75 of the FIG. 5 system in the manner contemplated by the present invention.

Referring first to FIG. 12, the computing and control portions include the central controller director (crossarm) computer 21, the operator control panel 115, cutter crossarm controllers 237-1 and 237-2 for the cutters 15A and 15B, printer crossarm controllers 237-3 and 237-4 for the printers 247A and 247B, four two-axis servo drives 245 for the four crossarms 127, each servo drive being controlled by a respective one of the four controllers 237, and respective ones carrying either a cutting head 15 or a printing head 247. Controlled by the control panel 115 are the A and B lasers 11A and 11B, miscellaneous machine functions 249.

The input to the cutting and printing equipment 75 is the previously generated cutting sequence tape 25. The crossarm computer 21 performs the following functions: (1) provide the buffering between the magnetic tape input 25 and the real time operation of the four crossarm controllers 237; (2) perform the required calculations to convert the magnetic tape input data into the data required by the controllers 237; and (3) monitor the system performance and produce (on the teletype 117) operator instructions and warnings as required.

The crossarm controllers 237 perform the interpolation and logic functions found in the heart of most numerical control machines. Each controller directs the X and Y motion of one crossarm 127, through a 2 axis power servo amplifier motor package. As mentioned previously, the crossarms 127 are essentially identical, and carry either a print head 247 or a laser optical assembly cutting head 15.

The operator monitors and directs only the critical machine operations through the control panel 115. The critical subsystems which service the machine are instrumented with transducers which are automatically interrogated by the control panel electronics. Through either lamps on the panel 115, or computer generated messages on the teletype 117, the operator will be alerted to potential system problems, or failures.

b. Functional requirements

Having described the computing and control sections of the exemplary FIG. 5 system in very general terms, there will next be discussed the performance requirements for various components of that section.

The primary functions of the crossarm computer 21 are (1) to read from the cutting sequence tape 25 the incremental crossarm position and control data, (2) to compute turning angle and dwell times from the tape data, and (3) to transfer straight line control commands to the crossarm controllers on demand. Because all crossarm controllers 237 operate simultaneously and independently, the rate at which the controllers will require data can be estimated, but the order in which the requests for data will occur is indeterminable. The computer 21 must, therefore, maintain separate data files for all crossarm controllers 237 tied to its input-output structure.

Computer requirements are determined from the quantity and type of input and output data, the number of units to be serviced, and the rate at which data must be handled. Computer performance requirements based upon these criteria will be given in the following paragraphs.

Let it be assumed that the cutting sequence tape 25 is an IBM 9 track, 800 BPI (bytes per inch. A byte is an 8-bit character, and is considered to be one half of a computer word which is 16 bits in length) magnetic tape, and that it is organized in major divisions, with each major division containing the position and control data necessary to command all crossarms 127 throughout one operating period (the time given to the crossarms to execute all commands between successive advances of the conveyor 17). Each major division on the tape will then be further divided into subdivisions containing up to 1,024 words each, with the control data in sequential order by crossarm. Each 1,024 word subdivision (or data block) will be composed of 341 three-word control messages, and of one additional word used to identify the data block for computer routing. Each three-word message will describe the incremental motion command in rectangular (X and Y) coordinates, and the functional commands for the laser and printer, for one straight line segment 170 (see FIG. 8).

The quantity of data to be processed by the computer 21 during each operating period depends mainly on how many peripheral inches are to be cut in a given time. A reasonable estimate is that an average of 1,500 peripheral inches of cutting (or printing) and dryhaul should be accomplished by each crossarm 127 during one operating period. Assuming an average of 1.2 inches per straight line segment (this has been derived from actual patterns), 1,250 straight line segments should be commanded per crossarm 127 per operating period.

In the exemplary system described herein the maximum number of commands per crossarm per operating period has been set at 2,000. This is considerably more than the maximum peripheral distance measured in any of the marker zones examined during a trade study of typical markers would indicate (1,820 peripheral inches, with 1,500 commands required).

For purposes of computer evaluation, each operating (printing and cutting) period may be assumed to be 100 seconds long, followed by a nine second conveyor advance time. In the worst case, the amount of input data required to control four crossarms 127 throughout one operating period would not exceed 8,000 commands. Since each command is encoded on the tape in a three-word message, there will be a maximum of 24,000 words per major tape division.

Assuming an average value of 1,250 messages per crossarm per operating period, 5,000 messages will be required per operating period for four crossarms or an average of 15,000 words on the tape. With the tape divided into 1,024 word subdivisions, an average of 15 data blocks separated by 0.75 inch inter-record gaps will have to be processed. Therefore, the average amount of data required to drive all crossarms 127 during one operating period will occupy 52 inches of magnetic tape when packed at 800 BPI.

The ideal time to transfer data from the magnetic tape 25 to the computer 21 is during the conveyor advance time. During this nine second transition period, no crossarm control data will be transmitted by the computer.

The basis criterion for input timing is that there must be no interference with the printing or cutting operations. When only one printing and cutting system 75 is operated from the computer 21, there is no problem with the input timing. However, where expansion to two or more such systems 75 per computer 21 is desired, thus requiring an equal number of magnetic tape inputs, the computer should be able to bring tape data into its memory for one set of controllers 237 while the other controllers remain in operation under computer control.

Turning next to the output data required of the computer 21, the exemplary crossarm controllers 237 described herein are essentially linear interpolators, and will be discussed in greater detail with reference to FIG. 14. To command crossarm motion in two axes, the controllers 237 require, for each straight line segment 170, a five-word input, consisting of the incremental change in the X and Y dimensions, the sine and cosine of the angle through which the cutter (or printer) must move, and the dwell time and functional commands to the laser 11 or printer 247.

The data from the magnetic tape 25 is used by the computer 21 to calculate the sine and cosine of the tool vector. Dwell time is determined principally as a function of the turning angle at the end of the line segment 170 (FIG. 8), and of the length of the line segment.

Since there will be an average of 1,250 straight line segments 170 per operating zone, (see above), each controller 237 will require 1,250 data transfers, at five words per transfer, over a 100 second interval. With the typical operating period being 100 seconds in duration, the average data rate will be 12.5 transfers per second per crossarm 127. In a four crossarm machine there will be an average of 20 milliseconds between data transfers. Therefore, process times within the computer 21 will have to be fast enough to allow data retrieval from memory, calculations of sine cosine and dwell times, and data filing for immediate transfer to the controllers 237 at the above average rate.

The computer 21 will need to respond to a request for data from any controller 237 on a modified priority interrupt basis. That is, whichever controller 237 is receiving data at a given time is given top priority so that the data transfer, once begun, will not be interrupted. Data should be transferred in five-word blocks, in bit parallel, word serial fashion under crossarm controller direction at a word transfer rate greater than 500 KHz.

Considering the performance requirements of the crossarm controllers 237 next, for each line segment to be executed each of them receives a message comprising five binary 16 bit words from the computer 21. These words contain the following information: (1) the incremental cutting and/or printing head position command in rectangular coordinates (2 words), (2) the sine and cosine of the angle which defines the desired cutting path relative to the rectangular coordinate system (2 words), and (3) acceleration/deceleration dwell time and functional commands such as Laser On, Laser Off, etc. (1 word).

As discussed with reference to FIG. 9, the incremental position commands as received from the computer 21 are converted to synchronized velocity commands in rectangular coordinates by the crossarm controllers 237. These velocity commands $V_x$ and $V_y$ are generated with a digital differential analyzer (DDA). The DDA performs the function of multiplying the maximum cutting velocity, assumed herein as (30 in/sec), by the cosine and sine of the cutting path angle respectively. The output of the DDA is a synchronized pulse train having a pulse rate proportional to the $V_x$ and $V_y$ velocity components, (i.e., pulses/sec proportional to in/sec). Additionally, the servo system is preferably scaled such that each output pulse of the DDA corresponds to 0.001 inch displacement of the cutting head.

The commanded incremental displacements as received from the computer 21 provide a method for controlling the number of pulses issued by the DDA and consequently the servo cutting head incremental displacement. By subtracting 0.001 from the commanded displacements as received from the computer 21 for each DDA pulse issued to the servo, the commanded displacement can be counted to zero. When zero is reached, the output of the DDA is inhibited. Inhibiting the output of the DDA, namely at the end of the velocity command, assures that the servo inputs are equivalent to the commanded positions as received from the computer 21. However, due to the velocity following error of the servo system proposed herein, the actual cutting head position does not coincide with the commanded position.

More particularly, the follow-up servos preferred for positioning the laser cutter and/or printer in response to the crossarm controllers 237 have a high gain, velocity inner loop and a relatively low gain, position outer loop. This design technique allows the position feedback loop to be critically damped and consequently the transient response to be free of overshoots. However, as a result of the relatively low gain, the position loop exhibits a large following error for velocity command inputs. This large following error (approximately 1.8 inches for a 30 in/sec velocity command) requires that a dwell command be included as part of each data block and that the dwell time be computed as part of each message that defines a line segment 170. The programmed dwell command allows the cutting head position to decay exponentially to the commanded position. The magnitude of the computed dwell time is calculated to allow the position error to be reduced to within the required cutting tolerance.

The computed dwell time is implemented by using a constant pulse rate generator to count down the dwell time register. By subtracting one from the dwell time number, as received from the computer, for each pulse, and inhibiting the pulses when zero is reached, the appropriate delay is obtained. At the conclusion of the dwell time command the crossarm controller issues a signal to the computer to load the next five-bit information message.

The remaining functions of the controller 237 are to decode the discrete functional commands as received from the computer 21. These decoded signals will provide the laser control signals, printer control signals, etc.

c. Equipment satisfying functional requirements

1. Crossarm Computer

The equipment and basic operating system selected to satisfy the functional requirements of the crossarm computer 21 are described in the following paragraphs. A large number of small general purpose digital machines are presently available to adequately perform the tasks delegated to the crossarm computer. The following will be based on one of them, the Hewlett Packard 2115A computer.

The Hewlett Packard 2115A has seven operating registers, uses a 16-bit word, and has a standard core memory of 4,096 words. The arithmetic section performs an add routine in 4.0 microseconds and a multiply in less than 200 microseconds. The input/output structure is contained within the computer's mainframe (which also includes a control, an active memory and an arithmetic unit), and connection to peripheral devices is made by using plug-in interface boards.

The following available options should be included as part of the computer main frame; (1) Extended Arithmetic Unit (EAU), (2) Additional 4K Core, (3) Direct Memory Access (DMA), and (4) Power Fail Protect. The EAU option, as on most small general purpose machines, allows multiplication and division processes at a higher rate than possible on the standard computer, and is necessary in order to enable the computer 21 to complete the calculations involving sine, cosine, turning angle and dwell time in sufficient time to satisfy the average output rate (20 milliseconds per output for four crossarms).

With respect to the second recommended option, the crossarm computer 21 will require approximately 5,300 words of core memory. The smallest increment in which additional core may be added is 4,096 words.

Core allocation is based on a crossarm computer 21 driving 4 crossarm controllers 237. Major occupants of core are: (1) Drivers: routines linking computer programs to peripheral devices being addressed. A driver resides in core for each peripheral device; (2) Tables: space allocated for data which will be brought in from magnetic tape, for data to be converted to the controller format, and for data ready to be transmitted to the controllers 237; (3) Programs: special programs used for system initiation, monitoring, and operator messages and programs to transfer data, perform special arithmetic algorithms, and service the peripheral devices; and (4) Subroutines: special algorithms, to be used as required by the main program are stored only once, and referred to many times. The subroutines are stored on the base page to make them directly addressable from any memory location.

Direct Memory Access (DMA) is required to permit block transfers of data between memory and the computer peripherals on a "cycle steal" basis. Without DMA, transfers from tape to memory must be under non-interruptable program control, resulting in a much reduced computer efficiency. DMA is a required option in most small computing systems equipped with disc or drum storage.

The fourth suggested option senses a decrease in power line voltage and causes the operating register contents to be stored in a known core location. This allows a smooth resumption of computer operation when power is restored.

The magnetic tape reader 23 should be an IBM-compatible nine-track 800 BPI reader with a read speed of 25 inches per second or greater. With a packing density of 800 BPI, and incuding 0.75 inch inter-record gaps between the 1,024 word data blocks, the average tape transfer to the computer of 15,000 16 bit words carrying the commands for an operative period will occupy approximately 52 inches of magnetic tape. Therefore, with a minimum read speed of 25 inches per second, slightly more than 2 seconds will be required to transfer data to the computer 21 for each operating period of the cutter-printer system 75 of FIG. 5.

A low cost mass data storage device of high reliability is required to provide a temporary file for storage of the data read from the cutting sequence tape 25 and permanent storage for service routines and the operating program. Using worst case considerations for four crossarms, what is required is 24,000 words of temporaty tape data storage plus an estimated 10,000 words allocated to permanent storage, or a total of 34,000 words of storage. A fixed head magnetic drum or disc with a capacity of greater than 60,000 words are to be preferred for this application. The small drum memories presently available have a faster average access time than disc memories, but both devices are acceptable.

The basic input/output capability of the 2115A computer needs to be augmented in two ways for the crossarm computer application. First, the number of input/output channels available on the standard machine is eight, with eight levels of priority interrupt. To service four crossarm controllers 237, the control panel 115, teletype 117, magnetic tape unit 25 and a drum memory 251, 10 input/output channels are required. (The magnetic tape and drum interfaces required two input/output channels each). A minimum sized I/O expander (24 channels) which provides a like number of additional priority interrupt levels, should therefore be included in the system.

Secondly, to provide a compatible interface between the computer 21 and the four crossarm controllers 237 and the control panel 115, five microcircuit interface boards should be added as part of the I/O structure. These boards set up a buffered data path between the computer 21 and the crossarm controllers 237 and the control panel 115. Each card contains a 16-bit output data register, a 16-bit input data register, and flag and control lines to direct data transfer.

A suitable operating system 21 based on the computer hardware just described is shown in FIG. 13. The system is interrupt driven, with all computer action initiated by system stimuli.

A program start switch (not illustrated) on the system control panel 115 starts the transfer of data from the cutting sequence tape 25 to the drum storage 251 through a 1,024 word input table 248. The transfer, once begun, is under DMA control and operates on a "cycle steal" basis. The control words associated with each sequence are interpreted by a control and display program 253 for print out on the teletype 117. Crossarm control data is filed on the drum 251 under the direction of a "mag tape to drum" program 255 into a separate drum file for each crossarm 237.

When the tape data for one operating period has been transferred to the drum 251, the "mag tape to drum" program 255 relinquishes control to a "table initiate" program 257. During this phase, data is read in sequence from each crossarm file on the drum 251 and is transferred into a respective one of four "A" tables 256, labeled A-1, A-2, A-3, A-4. Each table A holds 64 words. The "table initiate" program 257 steers data from a given Table A through a conversion program 259 called "calculate," which computes from the incremental X and Y commands, the sine, cosine and dwell time as required by each crossarm controller, and outputs five-word messages to each of four crossarm controller drivers 261. Each driver 261 is associated with a respective crossarm controller interface and will place the five-word message in a pair of Tables B and C in sequence, for later transfer to its associated crossarm controller 237.

When a controller such as the cutter A controller 237-1 (of FIG. 12) requests data, the associated driver 261 will first direct a data transfer from Table B. When Table B is depleted, (after 10 transfers) the driver 261 will then direct transfers from Table C. When either output table is depleted, the driver will also initiate data transfers from the proper Table A through the "calculate" program 259 to refill the empty table. When any Table A is exhausted, the "calculate" program 259 will address the drum driver 250 to load the next block of data into Table A.

As each crossarm file of the drum 251 is depleted, the crossarms 127 will be positioned at their respective park positions on the conveyor 17. When all crossarms are parked, the system logic will automatically initiate a conveyor advance and a new sequence will be loaded from the cutting sequence tape 25.

2. Crossarm Controllers

In the exemplary FIG. 5 system the four crossarm controllers 237, one of which is shown in FIG. 14, are identical units, and are installed in electronics cabinet 115a of the control panel 115. The interface hardware between the controllers 237 and the crossarm computer 21 is located, as described previously, in the computer input/ output structure (I/O).

Data transfer from the computer 21 is initiated by, and under the control of, the controllers 237. Logic circuits within each controller signal the computer 21 that data is required and clock the data from the computer I/O in a word-serial bit-parallel transfer. The data words are sequentially gated from the computer 21 into the sine, cosine, ΔX, ΔY and dwell time registers 265X, 265Y, 269, 271 and 273 of the controller 237. Each controller also includes registers (not shown) for receiving functional commands from the computer 21, such as commands to turn the lasers 125 on and off.

When the data transfer is complete, an interrupt flag from the controller 237 to the computer 21 is reset, and the controller operation begins.

As explained in the previous discussion of crossarm controller requirements, the primary function of the controllers 237 is to convert incremental position commands from the cutting sequence tape 25 into synchronized velocity commands for the servo systems 245. This conversion is accomplished by performing a digital computation commonly referred to as linear interpolation. In this application, linear interpolation results in the production of synchronized velocity commands to each of the two-axis servo systems 245. The velocity commands are issued by two digital differential analyzers (DDA's) operating with a common input variable.

In the crossarm controllers 237, the DDA's 277 consist of two recirculating 15-bit registers and an adder 278. The sine and cosine of the angle through which the cutter must move are loaded into the input-variable registers 265 of the two DDA's. The other, "R" registers 279 of the two DDA's are cleared prior to the start of calculations.

Each DDA multiplies the feedrate pulses from a common, 30 KHz feedrate generator 281 by the contents of the input-variable register 265 (never greater than unity). For linear interpolation, the algorithm $dz = ydx$ is performed, where $dz$ is the commanded velocity vector for a given axis, $y$ is the appropriate scalar (either sine or cosine), and $dx$ is the system variable (feedrate). Each pulse from the feedrate generator 281 causes the value held in the input register (265X or 265Y) of the DDA 227 to be added to the contents of the R register 279. When an overflow, or carry from the R register 279 occurs, it is sensed by logic in the DDA adder 278, and put out as a servo command pulse. If the value in the input-variable register 265 is 1.0, then every feedrate pulse results in a DDA output (servo command) pulse. One servo command pulse is an incremental position command to the servo, equaling 0.001 inch. If the value in the input-variable register 265 is zero, no DDA output pulses will be generated.

Feedrate pulses are generated at a maximum rate of 30 KHz, or 1 pulse per 33.3 microseconds. If this pulse rate were delivered unmodified to the servo system 245 (of FIG. 15) (that is, with the value in the input-variable register 265 equal to 1.0), a velocity command of 30 inches per second would result, (30 × $10^3$ pulses/sec × 0.001 inches/pulse). The feedrate frequency can be reduced from the 30 KHz maximum at the control panel 115 to match the servo velocity to the type of material being processed.

The value contained in the input-variable register 265 can vary from zero to 0.99999 in increments of 0.000031. Since each register overflow counts as a command of 0.001 inches, the resolution of the input sine or cosine, scaled to the output servo commands is $3 \times 10^{-8}$ inches per digital count.

The rate at which the pulses are issued to the servo 245 will be constant for each line segment, and will determine the velocity command to the servo.

The sign of the sine and cosine words determine the direction that the Y and X servos 245 will move. The sign occupies the sixteenth bit position of each word and is used by the servo system command counter logic (see FIG. 15) to determine direction.

To stop the interpolation process when the correct number of output pulses have been issued from each DDA 277, the servo command pulses are used to count down to zero the contents of the X and Y registers 269 and 271. When the pulses issued to the servo axis match the count held in the incremental count-down register 269 or 271, a zero detector 283 disables the respective DDA output and presents a logical one to a dwell enable AND gate 285. When both the X and Y zero detectors 283 are zero (they will be zero within one count of each other), the dwell enable signal will pass through the AND gate 285 and will automatically force the feedrate generator 281 to 30 KHz during the dwell period and will enable the eight-bit dwell down counter 273. Driven by the 30 KHz generator 281 through a divide-by-100 circuit 287, the dwell coutner 273 has a 3.3 millisecond per pulse resolution, since the pulse period from the divide-by-100 circuit 287 is 3.3 milliseconds. A total delay of approximately 830 milliseconds can be programmed. During dwell time, no servo commands are issued and the actual crossarm position closes to within the allowable error. When the dwell counter 273 reaches zero, a zero detector 289 (1) clears all controller registers and disables the zero detectors 283 in preparation for a new data load and (2) sets a flag (signal) to request the next five-word transfer from the computer 21.

In addition to the interpolation function, controller logic will direct a laser 125 or a printer to turn on and off and will issue whatever other functional commands may be required to control the crossarm equipment. An eight-bit register (not shown) is allocated to the functional command message, and will be decoded after each data transfer to control the crossarm equipment.

3. Servo System

To be described next is a servo sytem 245 suitable for driving all four of the crossarm assemblies 127. It appears in FIG. 15 and includes digital logic, analog position sensors, error amplifiers and width-modulated power servo amplifiers.

In the exemplary FIG. 5 system portions of the servo system are physically separated, with the low power level digital and analog circuits being contained in the control panel electronic cabinet 115a, and the servo amplifiers and motor controls being located in the cabinets 77 near the associated conveyor motors.

The servo system 245 consists of five subsystems: (1) A timing and synchronization circuit 291; (2) analog position sensing and phase detector circuits 293; (3) command counter and control circuits 295; (4) servo amplifiers and motor control 297; and (5) a conveyor to crossarm reference system 299.

Comprised of a clock oscillator 301, a reference counter 303 and resolver supply circuit 305, the timing and sync circuit 291 is common to all four servo sections which serve the four crossarm assemblies 127. The clock oscillator 301 provides a 2 MHz clock to the digital logic circuits in the controllers and the servo system, and is a crystal controlled unit. The clock frequency is counted down digitally by the reference counter 303. The reference counter output is a 400 Hz square wave and is passed through an active filter to provide a sine wave drive to the input windings of all Y and X resolvers 157 and 158.

The command counter control section 295 comprises two digital circuits, a command counter 307 and a command counter control logic block 309. The command counter 307 is a digital counter which has the same count capacity as the reference counter 303 and which reduces the clock oscillator 301 output to the same frequency as that counter. In other words the counters 303 and 307 are cycled at the same frequency by the clock oscillator 301.

The command counter control logic 390 serves to change the count state of the command counter 307 by one for each position command pulse received from one of the four controllers 237. When the system is started and initialized, all the counters are synchronized so that no phase offset exists in any of the servo position loops. A pulse received by a control logic 309 from a DDA 227 in FIG. 14 causes the count-down of the clock frequency by its associated command counter 307 to be either delayed or advanced, depending on the sign of the input-variable in the DDA input register 265. This shift in the count state of the command counter 307 relative to the count state of the reference counter 303 results in a phase unbalance in the servo position loop. The shift caused by the receipt of one DDA command pulse will equal the effect of the resolver rotating by one one-thousandth of a revolution.

In addition to the normal method of generating a servo error, the X axis command counters can be shifted by the conveyor-to-crossarm reference system 299, as will be explained subsequently.

The position sensing and phase detector circuits 293 each include a resolver 157 or 158, a resolver shaft angle to phase angle converter 311, and an extended range phase discriminator 313. Servo loop errors are generated when a phase unbalance exists between the output of the command counter 307 and the output of the shaft angle to phase angle converter 311. The shaft angle to phase angle converter 311 output is a constant amplitude signal, the phase of which is shifted with respect to the resolver 158 input excitation (and therefore with respect to the reference counter 303 square wave) as a function of the resolver shaft turning angle.

When the system is aligned, the resolver 158 will be adjusted so that the null (zero phase shift condition) in the system occurs when the crossarm assembly 127 is at its mechanical zero position.

When a phase difference occurs between the output of the command counter 307 and the shaft angle to phase angle converter 311, the phase shift is detected by the extended range phase discriminator 313. The output of the discriminator 313 is a dc voltage whose magnitude is proportional to the phase shift and whose polarity indicates the direction through which the resolver 158 must turn to renull the position loop.

In the exemplary FIG. 5 system a resolver is coupled to the lead screw of each axis such that one resolver revolution represents one inch of crossarm travel. Since the servo following error may exceed 1.0 inch, the sytem must be able to detect this following error and must generate commands that will position the servo at the proper resolver null. The extended range discriminator 313 will remember when one resolver revolution displacement exists between the actual null and the apparent null. Signals, proportional to the true servo error will be sent to the servo amplifier 297, even though apparent resolver errors are quite small.

Since the conveyor 17 is not a precision device and cannot be readily advanced by precisely the specified distance when a new "bite" is taken, it is desirable to slave the crossarms 127 to the conveyor 17 during conveyor motion so that registration with a partially cut marker will not be lost. Referring to FIG. 15, this is accomplished by the conveyor to crossarm reference system 299 which includes a rotatable hinged sensor arm 314 mounted on one of the crossarms 127 to engage a series of reference pins 315 which extend from one or more of the conveyor slats 99 near one of their ends and which run in a row along the X-axis (FIGS. 6 and 15). When the conveyor 17 is not in motion, the sensor arm 314 is swung out of engagement with the reference pins 315 so that the crossarm 127 on which it is mounted may move freely relative to the conveyor 17 as required for cutting or printing. When the conveyor 17 is to be advanced, all crossarms are moved to reference positions near one end of the travel of their lead screws 143. With the conveyor 17 and all crossarms 127 stationary, the sensor arm 314 engages one of the reference pins 315 by first swinging into line with them and then, by means of a positioning motor 317, advancing in the X-axis direction on its own slide (not shown) upon the underside of the crossarm assembly 127 until the sensor arm engages the nearest one of the reference pins 315. The X-axis servo loops of all the crossarms 127 are then enabled, and as the conveyor 17 is moved, the servos drive the X-axis lead screws 143 to keep the four crossarms 127 moving with the conveyor 17 so that the sensor arm 314 remains engaged to the same reference pin 315. When the conveyor 17 stops, the sensor arm 314 swings out of engagement with the reference pin 315. The stopping position of the lead screw 143 is the base from which the crossarms 127 all move back 10 ft. to reference positions for the next bite when the present bite has been cut and printed. Thus, since the crossarm assemblies 127 are slaved to and travel forward with the conveyor 17, its accuracy is not critical, except that the starting and stopping points must fall within the usable range of the lead screws 143.

Referring still to FIG. 15, to explain more fully how the crossarm sensor arm 314 operates when the conveyor 17 is advanced, with all crossarms 127 being in their "park" positions, a sensor motion control 316 is enabled, causing the sensor arm 314 to be deployed and to be driven upon its slide along the X axis by its positioning motor 317 in response to a signal from a potentiometer 318 whose shaft is mechanically coupled to the rotatable sensor arm 314. The potentiometer normally produces a signal which is applied through an amplifier 320 to the motor 317 which continues to drive the sensor arm 314 until the latter reaches the nearest of the pins 315. When thus brought against the pin 315, the sensor arm 314 turns, and so does the shaft of the potentiometer 318 until it reaches a zero output, or null, position. Turning of the sensor arm 314 also causes a reset integrator 319 to be enabled and the sensor arm servo loop 320 to be disabled. Then, upon conveyor advance, the reset integrator 319 will, in response to the output of the potentiometer 318, issue a number of pulses to all of the X-axis command counters 307 in proportion to the relative displacement between the conveyor and crossarm assemblies, as sensed by the potentiometer through the sensor arm 314. The X-axis servo loops now see a phase shift between their command counters 307 and their shaft angle to phase converters 311. Hence the X-axis motors 139 are driven to keep the outputs of the X-axis resolvers 158 in step with the shifting command counters 307, thereby driving the crossarm assemblies 127 at a rate which will keep the motion sensor arm 314 nulled, thus tracking the conveyor's advance.

An alternative technique for accurately positioning cutter or printer positioning devices such as the crossarm assemblies 127 relative to the conveyor of 17 is disclosed and claimed in the above-referenced Castro, Hasslinger, Newton, Toscano application on CONVEYOR ADVANCE INDEXING AND CORRECTION. In accordance with this technique as diclosed by Castro et al., a digital counter is stepped in response to each 0.001 inch advancement of the conveyor so that a nominal 5 foot movement of the conveyor accumulates a 60,000 count in the counter. The counter is automatically reset when the conveyor hs advanced through its nominal distance, which in the FIG. 5 embodiment of the present application would be 10 feet.

Means are provided for sensing the count state of the digital counter and for stopping the conveyor slightly past its nominal stopping position. The exact overshoot is indicated by the counter's contents and is fed to the computer 21 which is programmed to make a corresponding compensation to the cutter (or printer) positioning device. Thus, for example, if the conveyor overshoot is 0.150 inches past a nominal 10 foot advance, a counter recycles through 120,000 and stops at a count state of 150 which appears at its outputs as a set of digital signals which are then applied to the computer 21. The computer will then add a 0.150 inch movement along the X-axis to the movements originally called for by the production tape 25.

If the positioning devices are parked after each conveyor advance, then the compensating overshoot correction is applied after each such advance as just explained. Alternatively, if the positioning devices are left in their final positions after each conveyor advance so that at the end of the next advance their positions reflect the previously applied overshoot correction, the computer 21 notes the difference between the last and current conveyor advance overshoots, and applies only the difference to the positioning devices. Thus, if a given conveyor advance overshoot is 0.150 inches and the next advance overshoot is 0.165 inches, the computer would apply a 0.015 inch correction to the commands sent to the crossarm assemblies 127.

5. Summary of System Operation

Material spreading, cutting and printing, and cut piece retrieval are serially performed processes intended to fill the user's production orders. The choice of cutting sequence tape, fabric bolt, laser power and feed rate is predetermined for a production run and is delivered to the control console as part of a printed schedule sequence. The function of the operator at the console is to monitor and direct system performance while fulfilling production requirements in accordance with the printed production schedule.

Fabric bolts are changed on the spreader 43 as specified by the printed production schedule. This print-out will stipulate for the operators of the machine the description and order of the bolts required for a specific production run. Where only partial use of the bolt is made, the material can be separated by a knife on the spreader when the required length of fabric has been removed from the bolt. The remainder of the bolt can be easily removed from the spreader 43. Bolt changes will take approximately 30 seconds. The fabric spreader is loaded by one operator who proceeds to thread the fabric through by drawing a few feet of fabric from the roll then inserting it through a knife housing and placing a tension bar in position.

To maintain a continuous flow of fabric along the conveyor 17, the leading edge of the new bolt is positioned against the trailing edge of the preceding material. During normal operation there will be sufficient time between conveyor advances (approximately 2 minutes) for spreader loading and preliminary material positioning. When there is no previous bolt to guide the operator, it will be necessary to manually jog the conveyor 17 to bring the fabric leading edge in line with a starting point marked on the conveyor frame. This procedure is only required when starting a new bolt on an empty conveyor. All successive advances are automatically controlled by a programmed logic sequence at the end of each "bite."

With the selected material on the conveyor 17 and positioned at the start mark located in the first printing zone 91A, (and the correct cutting sequence tape loaded into the tape unit 23), the operator initiates the complete process by actuating a group of switches, most of them on the master control console 115 in the control booth 79, to place the system into operation under computer program command. As a result the four crossarm assemblies 127 which are in a park position from the last command in the previous production run, are activated to proceed with their individual tape-commanded and computer-processed cutting and printing routines. The program is serialized so that on the first bite, only the first printing crossarm is operating. By the fourth bite, (three ten-foot conveyor advances) all crossarms are operational and remain so to the end of the production run. At the end of their assigned task for each bite, the crossarms 127 return individually to their "Park Position" and actuate a switch which initiates the illumination of a display lamp on the control panel 115. When all four lamps are lit, (and the logic signals are ANDed), the conveyor will automatically advance the fabric to the next zone for the next bite. The conveyor tracker mechanism described with reference to FIG. 15 commands a servo response enabling the four crossarms to simultaneously and accurately follow the conveyor advance. This mode of operation will continue without further operator commands from the panel for the entire production run in normal operation.

CONCLUSION

What has been described herein is a system and a method which permit the cutting of material one high at a rapid enough rate to make such a cutting technique economical. In addition to making one high cutting practical, the present invention has many other advantages. For example, by using a focused laser beam as a cutting element the invention provides a cutting edge that never dulls. The use of numerical control techniques provides cutting accuracy and repeatability not obtainable with manual cutting. The positioning of cutting and printing stations side by side through which material is moved in succession for cutting and printing makes possible the integration of these two operations and the control of both by means of tape recorded commands thus making possible the production of marked parts with no increase in labor required.

While the present invention has been described in the context of garment manufacturing from a single layer of fabric, its advantages are sufficent to make its use desirable even for multi-layer cutting, and for the cutting of parts other than those intended for garments. An example of the latter is found in the shoe industry which could benefit from the present invention by applying it to the cutting of shoe parts out of leather or similar materials. Thin metal sheets may also be cut by the disclosed system.

What is claimed is:
1. A severing system comprising in combination:
   a. means for maintaining a radiant energy beam focused in a cutting plane within a cutting area;
   b. endless means, including air-permeable means substantially non-reflecting to said radiant energy beam for supporting material thereon in at least a single flat layer;
   c. means for moving said supporting means with said material thereon through said cutting area, with said material lying flat upon said supporting means substantially in said cutting plane within said cutting area;
   d. means for traversing said focused radiant energy beam, while it is focused in said plane, along a predetermined route over said work support surface within said cutting area which route includes a plurality of separate, spaced apart closed patterns so as to sever from said material along said route a plurality of parts conforming to said closed patterns; and
   e. means for interrupting said radiant energy beam when it is between said patterns.
2. A severing system in accordance with claim 1 characterized further in that said radiant energy beam is a laser beam.
3. A severing system in accordance with claim 2 characterized further by means for forcing gas to flow away from the underside of said air-permeable means so as to remove by-products produced by said severing.
4. The severing system of claim 2 characterized further in that said means for traversing includes a numerical control unit responsive to stored command signals representing points along said route.
5. A severing system comprising in combination:
   a. means for maintaining a radiant energy beam focused in a cutting plane within a cutting area;
   b. endless means including air-permeable means for supporting material thereon in at least a single flat layer and substantially non-reflective to said radiant energy beam;
   c. means for moving said supporting means with said material thereon through said cutting area, with said material lying flat upon said supporting means substantially in said cutting plane within said cutting area;
   d. means for traversing said beam, while it is focused in said plane, along a predetermined route over said work support surface within said cutting area which route includes a plurality of separate, spaced apart parts conforming to preselected closed patterns so as to sever said material along said route, thereby cutting said parts out of said material in said cutting area according to said patterns; and
   e. means for forcing gas to flow away from the underside of said air-permeable support means so as to remove by-products produced by said severing.
6. A severing system comprising in combination:
   a. stationary means for generating a beam of coherent radiation;

b. movable means for focusing a beam of coherent radiation received thereby in a cutting plane within a cutting area;

c. endless means including means substantially totally transmissive to said coherent radiation for supporting material substantially in said cutting plane in at least a single flat layer;

d. means for moving said movable focusing means within said cutting area in a second plane parallel to said cutting plane;

e. means for projecting said beam from said stationary means onto said focusing means during all of its positions in said cutting area;

f. means for moving said supporting means with said material thereon through said cutting area, with said material lying flat upon said supporting means substantially in said cutting plane within said cutting area; and g. means for commanding said moving means to move said focusing means along a predetermined route in said second plane so as to burn a corresponding route into and through the material lying on said supporting means in said cutting plane within said cutting area.

7. A system for severing patterns through a layer of material in accordance with stored signals representing the locations and perimeters of said patterns on said material comprising in combination:

a. means for projecting a focused beam of coherent radiation at any desired point within a cutting area;

b. endless conveying means for progressively advancing a layer of material into said cutting area and including air-permeable means for fully supporting said material therein flat and motionless, after each advancement thereof; and c. digital computing means for controlling said projecting means to move said focused beam over said air transmissive means within said cutting area in accordance with said stored signals after each advancement of said material into said cutting area, thereby severing said patterns through said material.

8. A system in accordance with claim 7 characterized further in that:

a. said projecting means includes a stationary laser beam source, movable means for focusing said beam onto said cutting plane and digital servo means for traversing said movable means along said cutting plane in response to a pair of velocity-representative pulse trains; and b. said digital computing means is programmed to derive said pulse trains from said stored signals.

9. A system in accordance with claim 7 and characterized further in that said conveying means is controlled by said computer to advance after the signals representing a predetermined group of said patterns have been executed by said projecting means.

10. A system according to claim 7 and characterized further by printing means movable under the control of said computer in response to additional stored signals for marking said material.

11. A system for producing, from a layer of material parts conforming to preselected patterns and marked with information comprising in combination:

a. means for storing signals digitally representing the periphery of each said pattern, the information to be marked on the part conforming to said pattern, and the desired locations of said parts relative to each other in said material;

b. means for cutting movable within a cutting area;

c. means for printing movable within a printing area separate from said cutting area;

d. endless, air-permeable conveying means for advancing a layer of material through said cutting and printing areas in succession so as to stop successive portions of said material in said cutting and printing areas; and e. computing means for controlling said cutting and printing means to execute cutting and printing paths upon said material concurrently in accordance with said stored signals after each stop of said conveying means.

12. The system of claim 11 characterized further in that said conveying means is a conveyor having an elongate flat work support surface, said cutting and printing areas form rectangular areas through which said conveyor moves, and in that there is additionally provided for each of said movable cutting and printing means a carriage movable in a plane parallel to said work support surface respective ones of said cutting and printing means being mounted on, and carried parallel to said work support surface by, respective ones of said carriages.

13. The system of claim 11 characterized further in that said conveying means moves so as to advance said layer of material first through said printing area and then through said cutting area, whereby printing paths are executed prior to cutting paths on respective ones of said successive portions of said material.

14. A severing system comprising in combination:

a. means for maintaining a laser beam focused in a cutting plane within a cutting area;

b. an endless conveyor including air-permeable means substantially non-reflecting to said laser beam for supporting material thereon in at least a single flat layer;

c. means for progressively advancing said supporting means with said material thereon through said cutting area in steps, with said material lying flat upon said supporting means and having successive portions thereof brought to a stop substantially in said cutting plane within said cutting area;

d. means responsive to stored control signals for traversing said focused laser beam, while it is focused in said plane and after a given portion of said material has been brought to a stop within said cutting area, along a predetermined route over said work support surface within said cutting area, which route includes a plurality of separate, spaced apart closed patterns so as to sever from said material along said route a plurality of parts conforming to said closed patterns; and e. means for interrupting said laser beam when it is between said patterns.

15. A severing system in accordance with claim 14 characterized further in that said means responsive to stored control signals includes a computer and a numerical control unit operatively coupled thereto and in that said computer is connected to said means for progressively advancing said supporting means and is operative to cause said last means to start a given one of its steps after said laser beam has been traversed over its predetermined route, said computer also being connected to said means for interrupting said laser beam and being responsive to stored control signals to start and stop said means for interrupting said laser beam.

* * * * *